US012574267B2

(12) United States Patent
Ma et al.

(10) Patent No.: US 12,574,267 B2
(45) Date of Patent: Mar. 10, 2026

(54) DEMODULATION REFERENCE SIGNAL MULTI-SLOT BUNDLING INDICATION

(71) Applicant: QUALCOMM INCORPORATED, San Diego, CA (US)

(72) Inventors: Ruifeng Ma, Beijing (CN); Yuwei Ren, Beijing (CN); Huilin Xu, Temecula, CA (US)

(73) Assignee: QUALCOMM Incorporated, San Diego, CA (US)

( * ) Notice: Subject to any disclaimer, the term of this patent is extended or adjusted under 35 U.S.C. 154(b) by 414 days.

(21) Appl. No.: 17/759,606

(22) PCT Filed: Feb. 19, 2021

(86) PCT No.: PCT/CN2021/076846
§ 371 (c)(1),
(2) Date: Jul. 27, 2022

(87) PCT Pub. No.: WO2021/164726
PCT Pub. Date: Aug. 26, 2021

(65) Prior Publication Data
US 2023/0087095 A1     Mar. 23, 2023

(30) Foreign Application Priority Data

Feb. 21, 2020   (WO) ................ PCT/CN2020/076104
Feb. 21, 2020   (WO) ................ PCT/CN2020/076225

(51) Int. Cl.
*H04L 25/02*          (2006.01)
*H04L 5/00*           (2006.01)
(Continued)

(52) U.S. Cl.
CPC ........ *H04L 25/0228* (2013.01); *H04L 5/0051* (2013.01); *H04L 5/0053* (2013.01);
(Continued)

(58) Field of Classification Search
CPC . H04B 7/0456; H04B 7/0695; H04L 25/0228; H04L 5/0007; H04L 5/0051
See application file for complete search history.

(56) References Cited

U.S. PATENT DOCUMENTS 10,462,778 B2     10/2019   Li et al.
10,736,129 B2 *   8/2020   Park ..................... H04L 1/1812
(Continued)

FOREIGN PATENT DOCUMENTS

CN        108809560   A      11/2018
CN        110476377   A      11/2019
(Continued)

OTHER PUBLICATIONS

Supplementary European Search Report—EP21757240—Search Authority—The Hague—Feb. 19, 2024.
(Continued)

*Primary Examiner* — Zhensheng Zhang
(74) *Attorney, Agent, or Firm* — Holland & Hart LLP

(57)          ABSTRACT

Methods, systems, and devices for wireless communications are described. A user equipment (UE) may receive, from a base station, an indication of a demodulation reference signal bundling configuration to be used by the UE for demodulating a grant. The UE may bundle a plurality of demodulation reference signals received across a plurality of slots according to the demodulation reference signal bundling configuration. The UE may perform channel estimation based at least in part on the bundled demodulation reference signals. The UE may demodulate the grant based at least in part on the channel estimation.

21 Claims, 25 Drawing Sheets

Transmit, to a UE in a first time interval, a first trigger indicating that a next time interval after the first time interval is a start of a first bundle of time intervals containing PDCCH DMRS ⟍ 2510

Transmitt, to the UE in a second time interval, a second trigger indicating that a next time interval after the second time interval is a start of a second bundle of time intervals containing PDCCH DMRS, wherein the UE is expected to measure PDCCH DMRS from the base station in each time interval after the first time interval until the second trigger. ⟍ 2520

2500

(51) Int. Cl.
H04W 72/0446 (2023.01)
H04W 72/23 (2023.01)

(52) U.S. Cl.
CPC ....... H04L 5/0094 (2013.01); H04W 72/0446
(2013.01); H04W 72/23 (2023.01)

(56) References Cited

U.S. PATENT DOCUMENTS

| | | | |
|---|---|---|---|
| 2013/0343313 A1 * | 12/2013 | Takeda ................... | H04L 1/0028 |
| | | | 370/329 |
| 2019/0052421 A1 | 2/2019 | Yin et al. | |
| 2019/0159181 A1 | 5/2019 | Manolakos et al. | |
| 2019/0222380 A1 | 7/2019 | Manolakos et al. | |
| 2019/0313436 A1 | 10/2019 | Lee et al. | |

FOREIGN PATENT DOCUMENTS

| | | | | |
|---|---|---|---|---|
| CN | 110731071 A | 1/2020 | | |
| CN | 110771232 A | 2/2020 | | |
| EP | 3018854 A1 * | 5/2016 | ........... | H04L 1/1607 |
| WO | WO-2018077877 A1 | 5/2018 | | |
| WO | WO-2019099517 A1 | 5/2019 | | |
| WO | WO-2021050735 A1 | 3/2021 | | |
| WO | WO-2021159553 A1 | 8/2021 | | |

OTHER PUBLICATIONS

International Search Report and Written Opinion—PCT/CN2020/076104—ISA/EPO—Jun. 28, 2020.

International Search Report and Written Opinion—PCT/CN2021/076846—ISA/EPO—May 19, 2021.
SAMSUNG: "Continuous Precoding of NR DMRS in Time Domain", 3GPP TSG RAN WG1 Meeting #88, R1-1702913, Athens, Greece, Feb. 13, 2017-Feb. 17, 2017, Feb. 17, 2017 (Feb. 17, 2017), XP055735359, 3 pages, Retrieved from the Internet: URL: https://www.3gpp.org/ftp/tsg_ran/WG1_RL1/TSGR1_88/Docs/R1-1702913.zip [retrieved on Sep. 30, 2020] the whole document.
ZTE: "Discussion on Beam Indication", 3GPP TSG RAN WG1 Meeting #90, R1-1712298, Prague, Czechia, Aug. 21, 2017-Aug. 25, 2017, 7 Pages, Aug. 25, 2017 (Aug. 25, 2017) Sections 1-2.
ZTE: "Discussion on DL Beam Management", 3GPP TSG RAN WG1 NR Ad-Hoc#2, R1-1710183, Qingdao, P. R. China, Jun. 27, 2017-Jun. 30, 2017, 15 Pages, Jun. 30, 2017 (Jun. 30, 2017) Sections 1, 4.
European Search Report—EP242000875—Search Authority—The Hague—Dec. 17, 2024.
Huawei, et al., "Design of DL DMRS for Data Transmission," 3GPP TSG RAN WG1 Meeting #90, 3GPP Draft; R1-1712243, 3rd Generation Partnership Project (3GPP), vol. RAN WG1, No. Prague, Czech Republic; Aug. 21, 2017-Aug. 25, 2017, Aug. 20, 2017, XP051315060, 8 Pages, the whole document.
Huawei, et al., "Design of DMRS for DL/UL Data Transmission", 3GPP TSG RAN WG1 Meeting AH NR#3, R1-1715472, 3rd Generation Partnership Project, Mobile Competence Centre, 650, Route Des Lucioles, F-06921 Sophia-Antipolis Cedex, France, vol. RAN WG1, No. Nagoya, Japan, Sep. 18, 2017-Sep. 21, 2017, Sep. 11, 2017, XP051338940, XP051329257, 16 Pages, the whole document.

* cited by examiner

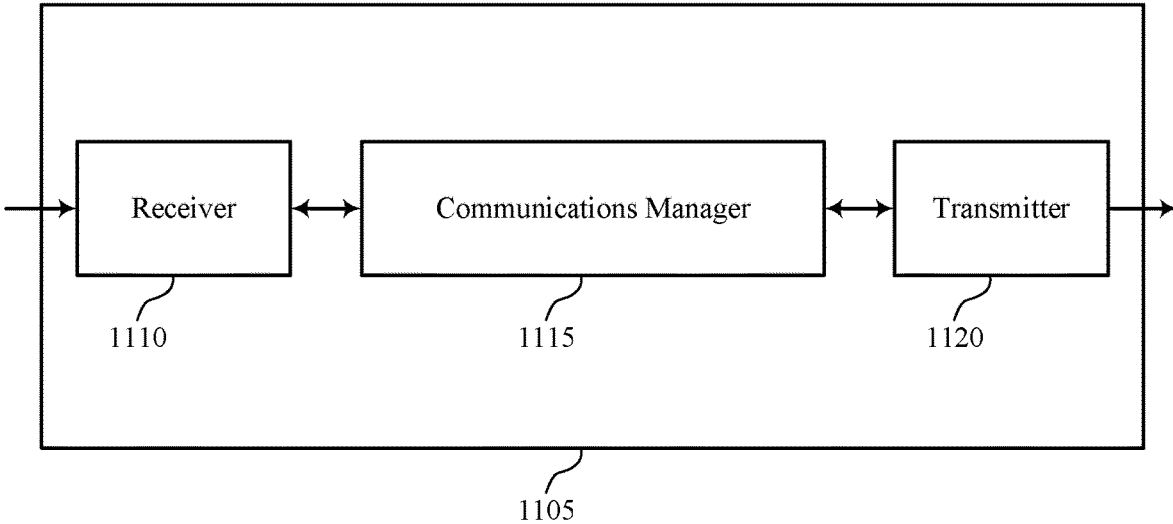
1110     1115     1120
1105
1100
FIG. 11

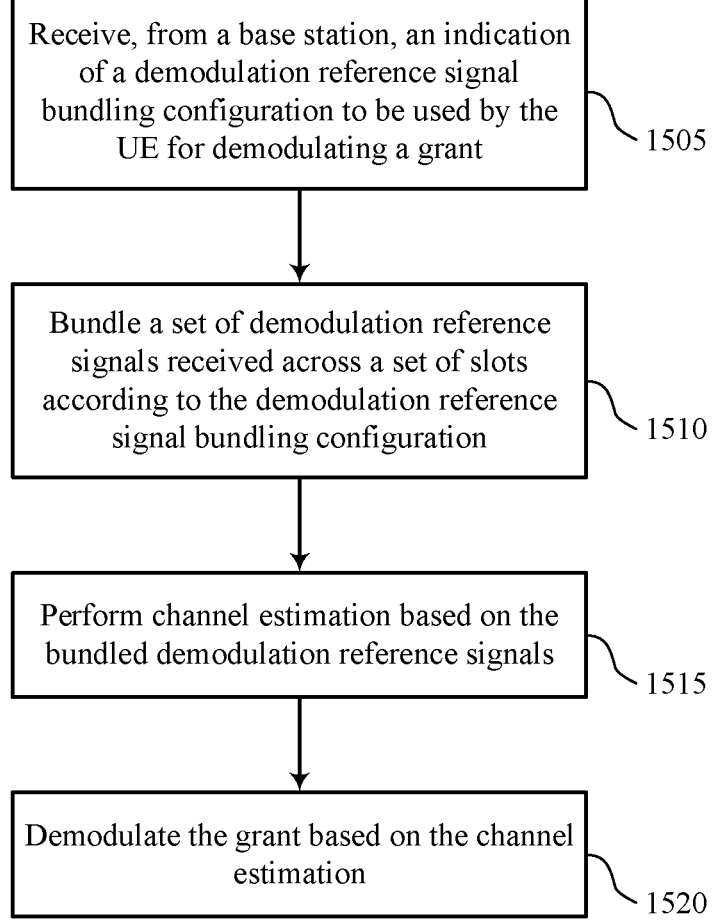

Receive, from a base station, an indication of a demodulation reference signal bundling configuration to be used by the UE for demodulating a grant

1505

Bundle a set of demodulation reference signals received across a set of slots according to the demodulation reference signal bundling configuration

1510

Perform channel estimation based on the bundled demodulation reference signals

1515

Demodulate the grant based on the channel estimation

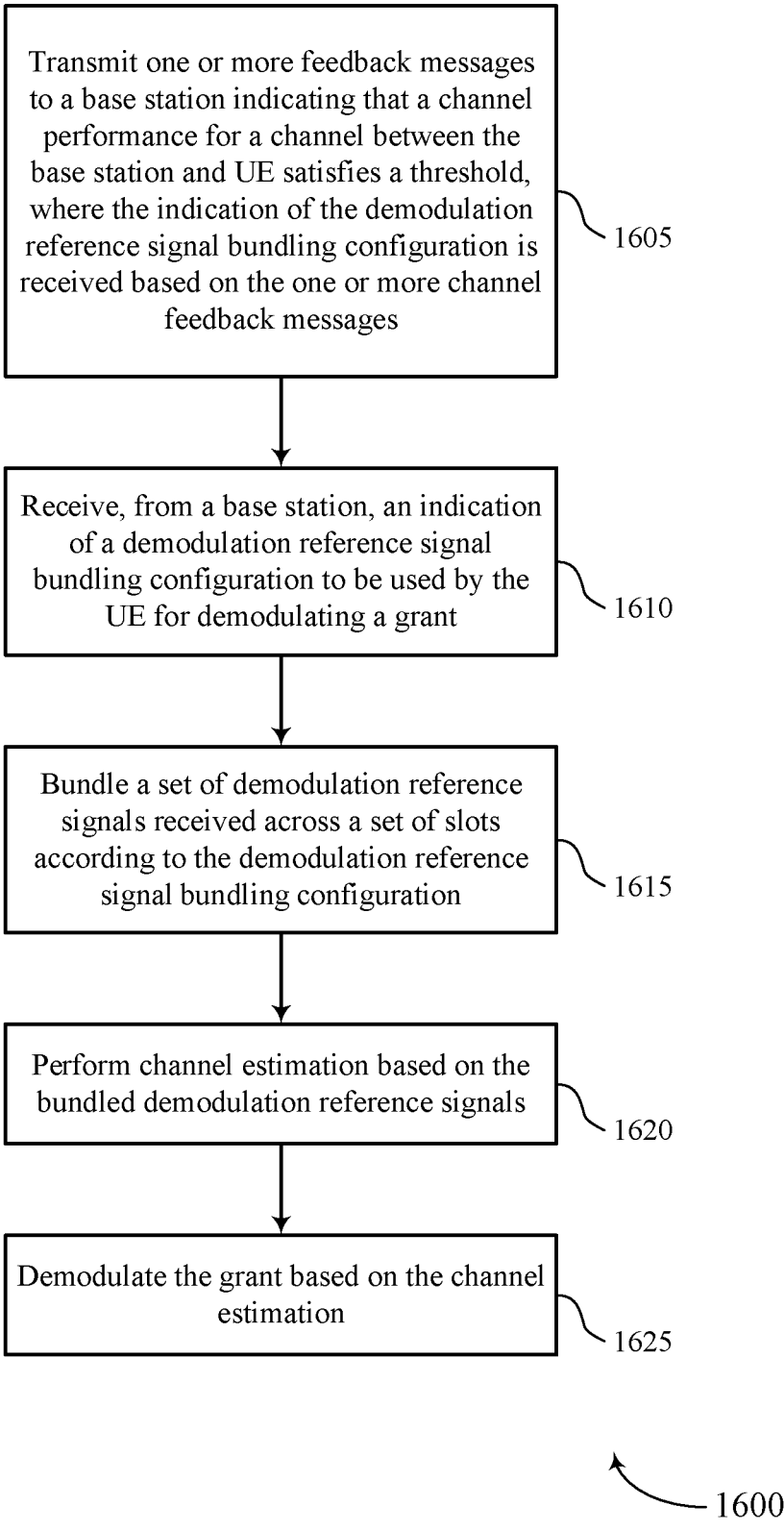

Transmit one or more feedback messages to a base station indicating that a channel performance for a channel between the base station and UE satisfies a threshold, where the indication of the demodulation reference signal bundling configuration is received based on the one or more channel feedback messages

1605

Receive, from a base station, an indication of a demodulation reference signal bundling configuration to be used by the UE for demodulating a grant

1610

Bundle a set of demodulation reference signals received across a set of slots according to the demodulation reference signal bundling configuration

1615

Perform channel estimation based on the bundled demodulation reference signals

1620

Demodulate the grant based on the channel estimation

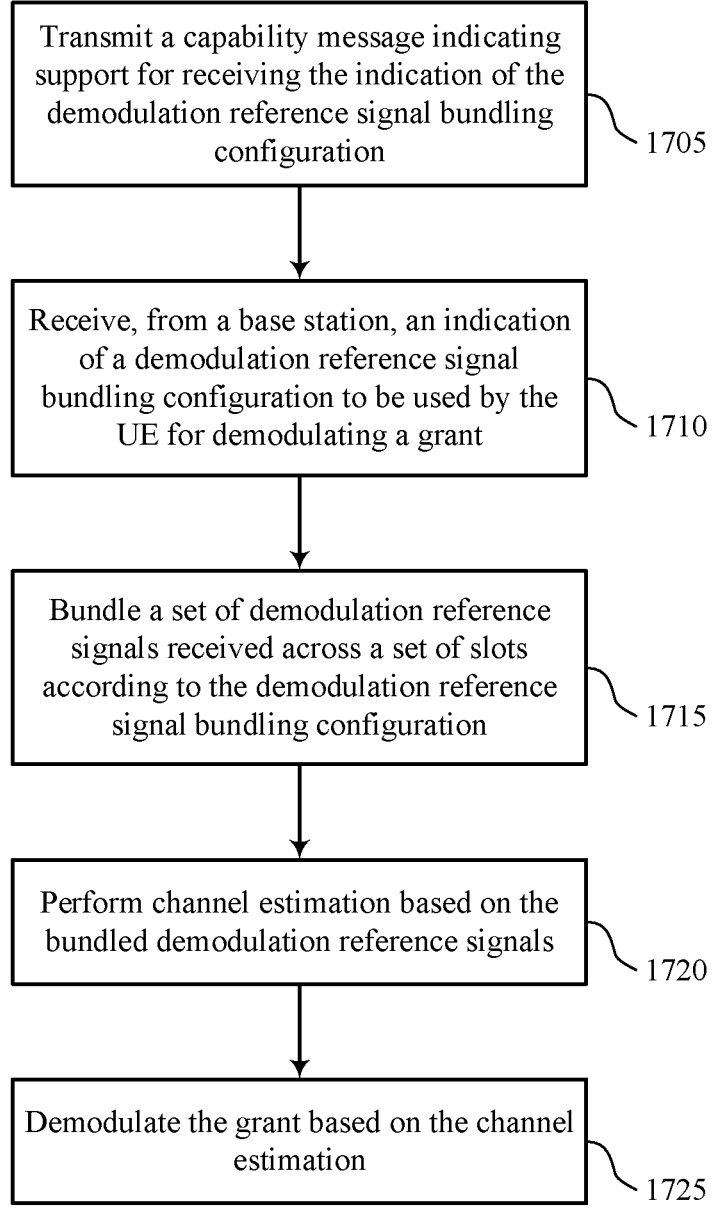

Transmit a capability message indicating support for receiving the indication of the demodulation reference signal bundling configuration
1705

Receive, from a base station, an indication of a demodulation reference signal bundling configuration to be used by the UE for demodulating a grant
1710

Bundle a set of demodulation reference signals received across a set of slots according to the demodulation reference signal bundling configuration
1715

Perform channel estimation based on the bundled demodulation reference signals
1720

Demodulate the grant based on the channel estimation
1725

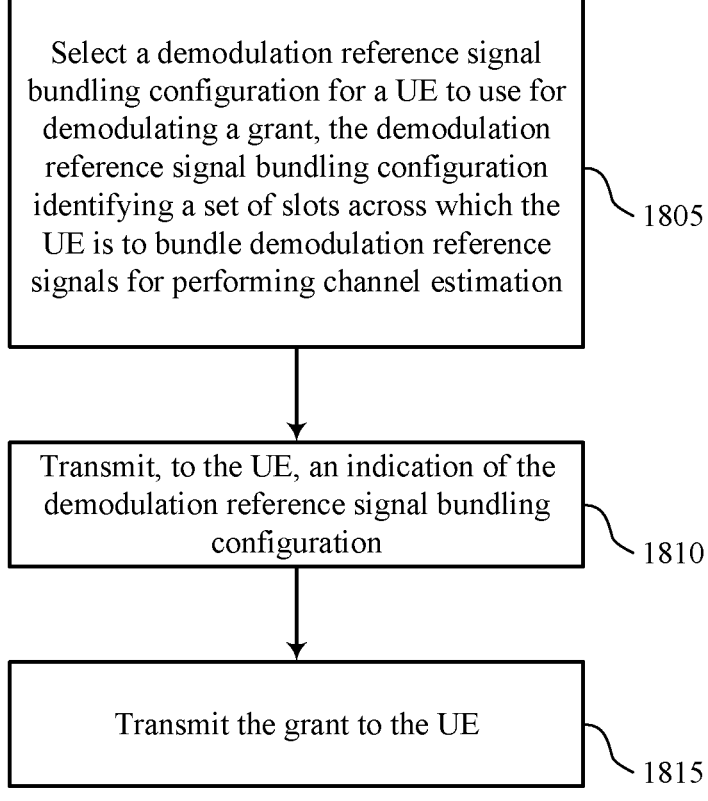

Select a demodulation reference signal bundling configuration for a UE to use for demodulating a grant, the demodulation reference signal bundling configuration identifying a set of slots across which the UE is to bundle demodulation reference signals for performing channel estimation

1805

Transmit, to the UE, an indication of the demodulation reference signal bundling configuration

1810

Transmit the grant to the UE

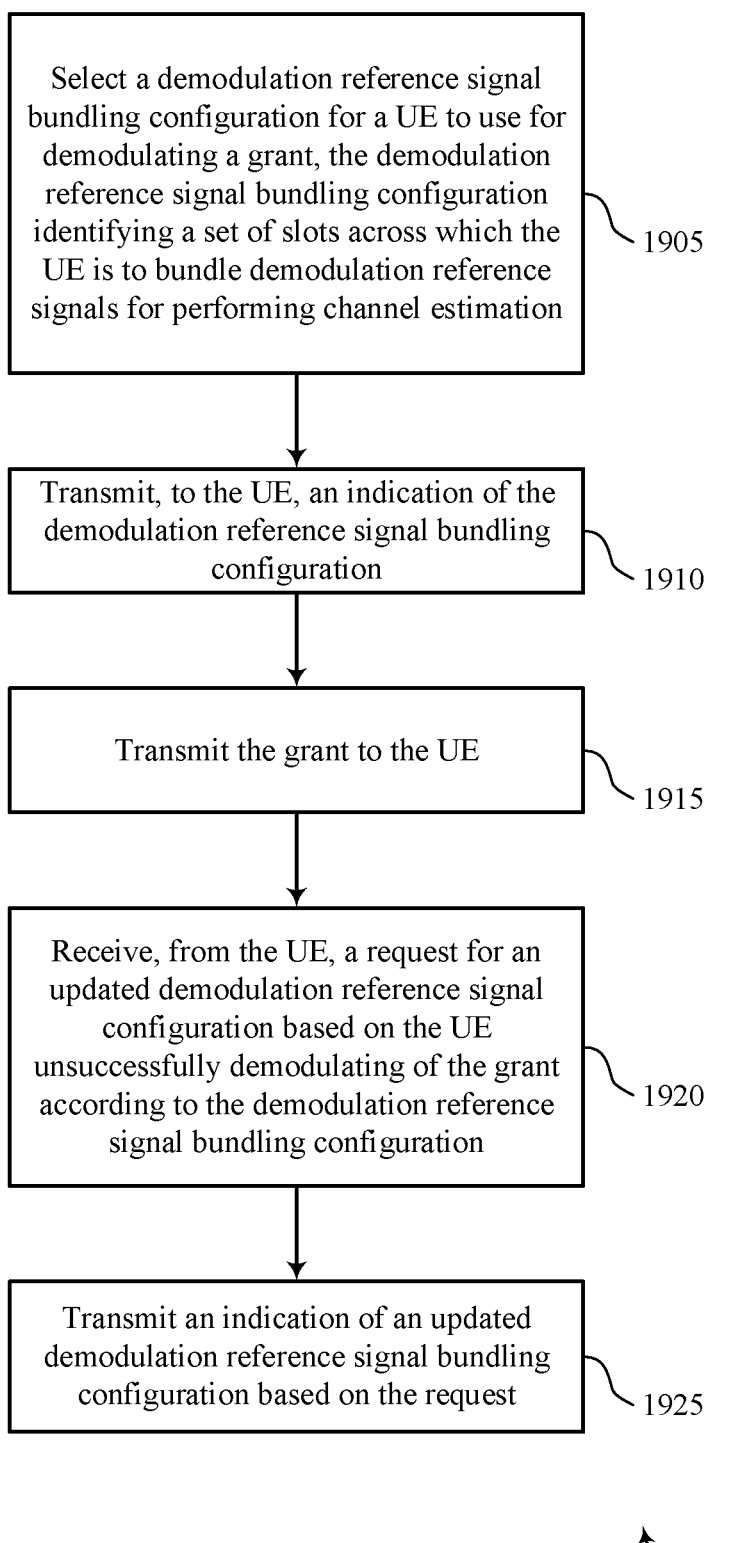

Select a demodulation reference signal bundling configuration for a UE to use for demodulating a grant, the demodulation reference signal bundling configuration identifying a set of slots across which the UE is to bundle demodulation reference signals for performing channel estimation

1905

Transmit, to the UE, an indication of the demodulation reference signal bundling configuration

1910

Transmit the grant to the UE

1915

Receive, from the UE, a request for an updated demodulation reference signal configuration based on the UE unsuccessfully demodulating of the grant according to the demodulation reference signal bundling configuration

1920

Transmit an indication of an updated demodulation reference signal bundling configuration based on the request

Figure 24:
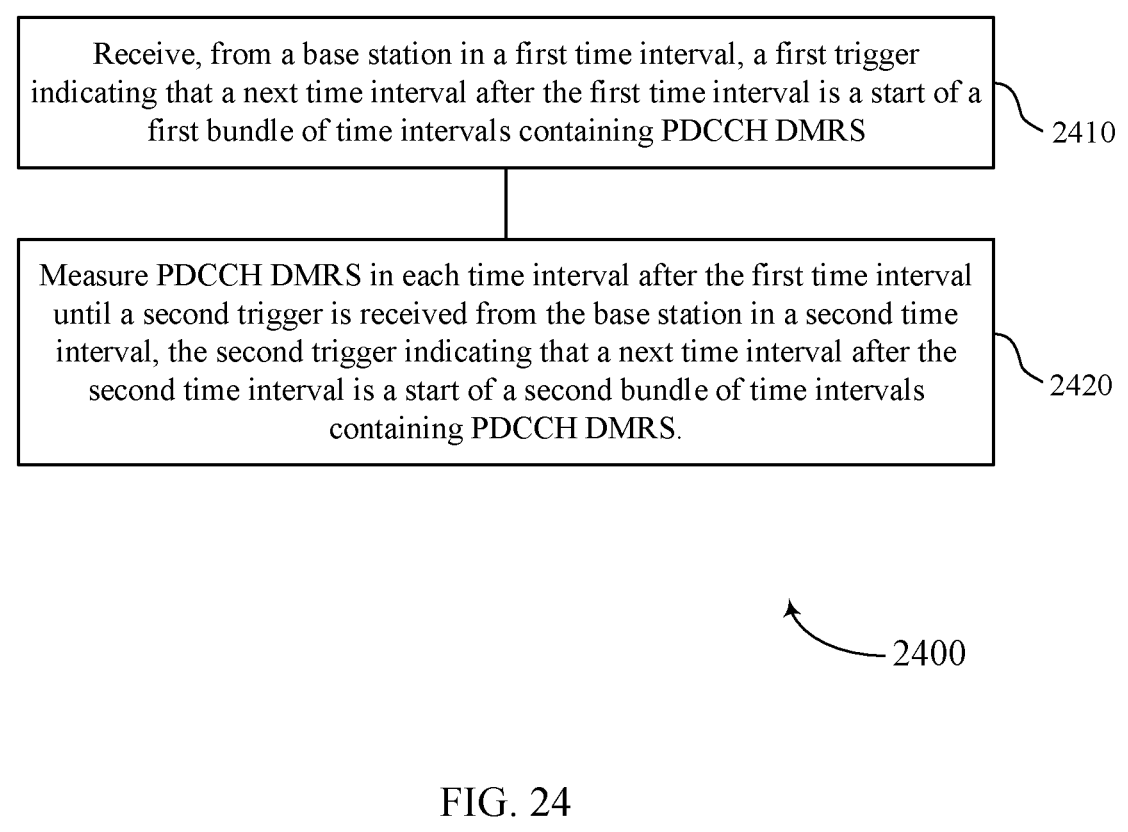

Receive, from a base station in a first time interval, a first trigger indicating that a next time interval after the first time interval is a start of a first bundle of time intervals containing PDCCH DMRS

2410

Measure PDCCH DMRS in each time interval after the first time interval until a second trigger is received from the base station in a second time interval, the second trigger indicating that a next time interval after the second time interval is a start of a second bundle of time intervals containing PDCCH DMRS.

Figure 25:
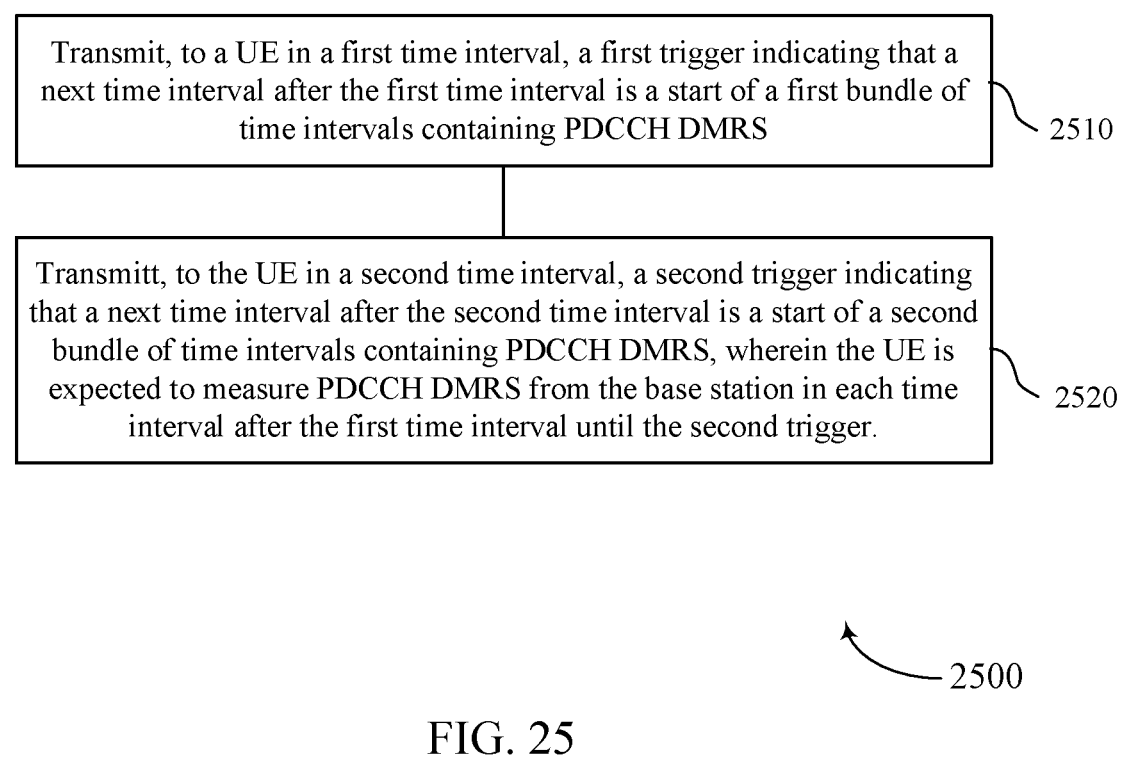

Transmit, to a UE in a first time interval, a first trigger indicating that a next time interval after the first time interval is a start of a first bundle of time intervals containing PDCCH DMRS

2510

Transmitt, to the UE in a second time interval, a second trigger indicating that a next time interval after the second time interval is a start of a second bundle of time intervals containing PDCCH DMRS, wherein the UE is expected to measure PDCCH DMRS from the base station in each time interval after the first time interval until the second trigger.

DEMODULATION REFERENCE SIGNAL MULTI-SLOT BUNDLING INDICATION

CROSS-REFERENCE

The present Application is a 371 national stage filing of International PCT Application No. PCT/CN2021/076846 by MA et al. entitled "DEMODULATION REFERENCE SIGNAL MULTI-SLOT BUNDLING INDICATION," filed Feb. 19, 2021; and claims priority to International Application No. PCT/CN2020/076104 by MA et al., entitled "DEMODULATION REFERENCE SIGNAL MULTI-SLOT BUNDLING INDICATION," filed Feb. 21, 2020, and to International Application No. PCT/CN2020/076225 by REN et al., entitled "DCI-GUIDED PDCCH DMRS RECEPTION BUNDLING," filed Feb. 21, 2020, each of which is assigned to the assignee hereof, and each of which is expressly incorporated by reference in its entirety herein.

FIELD OF TECHNOLOGY

The following relates generally to wireless communications and more specifically to demodulation reference signal (DMRS) multi-slot bundling indication and DCI-guided physical downlink control channel (PDCCH) DMRS reception bundling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support demodulation reference signal (DMRS) multi-slot bundling indication. Generally, the described techniques provide various techniques for a base station to transmit, provide for output, or otherwise convey an indication of a DMRS bundling configuration to a user equipment (UE), with the UE using the bundled DMRS for channel estimation to demodulate grants received from the base station over a control channel. For example, the base station may select a DMRS bundling configuration for the UE to use for channel estimation for grants received over a control channel (e.g., a physical downlink control channel (PDCCH)). The DMRS bundling configuration may be based on the performance of the control channel, an interference level detected by the UE, a rate of interference level change experienced by the UE, and the like. Broadly, the DMRS bundling configuration may identify the slots from which the UE is to bundle DMRS for channel estimation of the control channel. The base station may transmit or otherwise provide an indication of the DMRS bundling configuration to the UE, which bundles the DRMS received over the control channel according to the DMRS bundling configuration. The UE then uses the bundled DMRS for decoding a grant from the base station. For example, the base station may provide the indication of the DMRS bundling configuration to the UE in a downlink control information (DCI) grant, a radio resource control (RRC) grant and/or message, and the like. The UE may implement the indicated DMRS bundling configuration until the base station indicates an updated DMRS bundling configuration (e.g., a new DMRS bundling configuration for the UE). The UE may receive, decode, or otherwise demodulate grants (e.g., DCI grants and/or RRC grants) received from the base station using the DMRS that were bundled according to the DMRS bundling configuration.

A method of wireless communications at a UE is described. The method may include receiving, from a base station, an indication of a DMRS bundling configuration to be used by the UE for demodulating a grant, bundling a set of DMRSs received across a set of slots according to the DMRS bundling configuration, performing a channel estimation based on the bundled DMRSs, and demodulating the grant based on the channel estimation.

An apparatus for wireless communications at a UE is described. The apparatus may include a processor, memory coupled with the processor, and instructions stored in the memory. The instructions may be executable by the processor to cause the apparatus to receive, from a base station, an indication of a DMRS bundling configuration to be used by the UE for demodulating a grant, bundle a set of DMRSs received across a set of slots according to the DMRS bundling configuration, perform a channel estimation based on the bundled DMRSs, and demodulate the grant based on the channel estimation.

Another apparatus for wireless communications at a UE is described. The apparatus may include means for receiving, from a base station, an indication of a DMRS bundling configuration to be used by the UE for demodulating a grant, bundling a set of DMRSs received across a set of slots according to the DMRS bundling configuration, performing a channel estimation based on the bundled DMRSs, and demodulating the grant based on the channel estimation.

A non-transitory computer-readable medium storing code for wireless communications at a UE is described. The code may include instructions executable by a processor to receive, from a base station, an indication of a DMRS bundling configuration to be used by the UE for demodulating a grant, bundle a set of DMRSs received across a set of slots according to the DMRS bundling configuration, perform a channel estimation based on the bundled DMRSs, and demodulate the grant based on the channel estimation.

In some examples of the method, apparatuses, and non-transitory computer-readable medium described herein, the indication may be received in at least one of a DCI grant, or a RRC grant, or a combination thereof.

Some examples of the method, apparatuses, and non-transitory computer-readable medium described herein may further include operations, features, means, or instructions for transmitting one or more feedback messages to the base station indicating that a channel performance for a channel between the base station and UE satisfies a threshold, where the indication of the DMRS bundling configuration may be received based on the one or more channel feedback messages.

Some examples of the method, apparatuses, and non-transitory computer-readable medium described herein may further include operations, features, means, or instructions for bundling the set of DMRSs during a set of slots according to the DMRS bundling configuration, where the set of slots begin with the first slot and include one or more subsequent slots.

Some examples of the method, apparatuses, and non-transitory computer-readable medium described herein may further include operations, features, means, or instructions for bundling the set of DMRSs during a set of slots according to the DMRS bundling configuration, where the set of slots begin with one or more previous slots before the first slot and include at least the first slot.

Some examples of the method, apparatuses, and non-transitory computer-readable medium described herein may further include operations, features, means, or instructions for receiving an indication of a buffering reception mode bundling the set of DMRSs in a RRC grant.

In some examples of the method, apparatuses, and non-transitory computer-readable medium described herein, bundling the set of DMRSs may include operations, features, means, or instructions for bundling the set of the DMRSs during a first subset of slots according to the DMRS bundling configuration, and bundling the set of the DMRSs during a second subset of slots according to the DMRS bundling configuration.

In some examples of the method, apparatuses, and non-transitory computer-readable medium described herein, the first subset of slots at least partially overlaps with the second subset of slots.

In some examples of the method, apparatuses, and non-transitory computer-readable medium described herein, the first subset of slots may be non-overlapping with the second subset of slots.

Some examples of the method, apparatuses, and non-transitory computer-readable medium described herein may further include operations, features, means, or instructions for bundling the set of DMRSs may be based on detecting the grant.

Some examples of the method, apparatuses, and non-transitory computer-readable medium described herein may further include operations, features, means, or instructions for transmitting a capability message indicating support for receiving the indication of the DMRS bundling configuration.

In some examples of the method, apparatuses, and non-transitory computer-readable medium described herein, the capability message indicates a number of slots that the UE supports bundling.

Some examples of the method, apparatuses, and non-transitory computer-readable medium described herein may further include operations, features, means, or instructions for determining that the demodulation of the grant was unsuccessful, and transmitting a request for an updated DMRS bundling configuration based on the unsuccessful demodulation of the grant.

In some examples of the method, apparatuses, and non-transitory computer-readable medium described herein, the indication may be received in at least one of a UE-specific grant, or a common grant, or a combination thereof.

A method of wireless communications at a base station is described. The method may include selecting a DMRS bundling configuration for a UE to use for demodulating a grant, the DMRS bundling configuration identifying a set of slots across which the UE is to bundle DMRSs for performing channel estimation, transmitting, to the UE, an indication of the DMRS bundling configuration, and transmitting the grant to the UE.

An apparatus for wireless communications at a base station is described. The apparatus may include a processor, memory coupled with the processor, and instructions stored in the memory. The instructions may be executable by the processor to cause the apparatus to select a DMRS bundling configuration for a UE to use for demodulating a grant, the DMRS bundling configuration identifying a set of slots across which the UE is to bundle DMRSs for performing channel estimation, transmit, to the UE, an indication of the DMRS bundling configuration, and transmit the grant to the UE.

Another apparatus for wireless communications at a base station is described. The apparatus may include means for selecting a DMRS bundling configuration for a UE to use for demodulating a grant, the DMRS bundling configuration identifying a set of slots across which the UE is to bundle DMRSs for performing channel estimation, transmitting, to the UE, an indication of the DMRS bundling configuration, and transmitting the grant to the UE.

A non-transitory computer-readable medium storing code for wireless communications at a base station is described. The code may include instructions executable by a processor to select a DMRS bundling configuration for a UE to use for demodulating a grant, the DMRS bundling configuration identifying a set of slots across which the UE is to bundle DMRSs for performing channel estimation, transmit, to the UE, an indication of the DMRS bundling configuration, and transmit the grant to the UE.

In some examples of the method, apparatuses, and non-transitory computer-readable medium described herein, the indication may be transmitted in at least one of a DCI grant, or a RRC grant, or a combination thereof.

Some examples of the method, apparatuses, and non-transitory computer-readable medium described herein may further include operations, features, means, or instructions for receiving one or more feedback messages from the UE indicating that a channel performance for a channel between the base station and UE satisfies a threshold, where the indication of the DMRS bundling configuration may be transmitted based on the one or more channel feedback messages.

In some examples of the method, apparatuses, and non-transitory computer-readable medium described herein, the DMRS bundling configuration may be based on a first subset of slots that at least partially overlap with a second subset of slots.

In some examples of the method, apparatuses, and non-transitory computer-readable medium described herein, the DMRS bundling configuration may be based on a first subset of slots that may be non-overlapping with a second subset of slots.

Some examples of the method, apparatuses, and non-transitory computer-readable medium described herein may further include operations, features, means, or instructions for receiving a UE capability message indicating support for the UE to receive the indication of the DMRS bundling configuration, where the selected DMRS bundling configuration may be based on the UE capability message.

In some examples of the method, apparatuses, and non-transitory computer-readable medium described herein, the capability message indicates a number of slots that the UE supports bundling.

Some examples of the method, apparatuses, and non-transitory computer-readable medium described herein may further include operations, features, means, or instructions for receiving, from the UE, a request for an updated DMRS bundling configuration based on the UE unsuccessfully demodulating of the grant according to the DMRS bundling configuration, and transmitting an indication of the updated DMRS bundling configuration based on the request.

In some examples of the method, apparatuses, and non-transitory computer-readable medium described herein, the indication may be transmitted in at least one of a UE-specific grant, or a common grant, or a combination thereof.

Some examples of the method, apparatuses, and non-transitory computer-readable medium described herein may further include operations, features, means, or instructions for transmitting an indication of a buffering reception mode for the UE to bundle the DMRSs in a RRC grant.

In an aspect, a method of wireless communication performed by a user equipment (UE) includes receiving, from a base station in a first time interval, a first trigger indicating that a next time interval after the first time interval is a start of a first bundle of time intervals containing physical downlink control channel (PDCCH) demodulation reference signals (DMRS), and measuring PDCCH DMRS in each time interval after the first time interval until a second trigger is received from the base station in a second time interval, the second trigger indicating that a next time interval after the second time interval is a start of a second bundle of time intervals containing PDCCH DMRS.

In an aspect, a method of wireless communication performed by a base station includes transmitting, to a UE in a first time interval, a first trigger indicating that a next time interval after the first time interval is a start of a first bundle of time intervals containing PDCCH DMRS, and transmitting, to the UE in a second time interval, a second trigger indicating that a next time interval after the second time interval is a start of a second bundle of time intervals containing PDCCH DMRS, wherein the UE is expected to measure PDCCH DMRS from the base station in each time interval after the first time interval until the second trigger.

BRIEF DESCRIPTION OF THE DRAWINGS

FIGS. 11 and 12 show block diagrams of devices that support DMRS multi-slot bundling indication in accordance with aspects of the present disclosure.

FIGS. 15 through 19 show flowcharts illustrating methods that support DMRS multi-slot bundling indication in accordance with aspects of the present disclosure.

FIGS. 24 and 25 illustrate exemplary methods of wireless communication, according to aspects of the disclosure.

DETAILED DESCRIPTION

Figure 1:
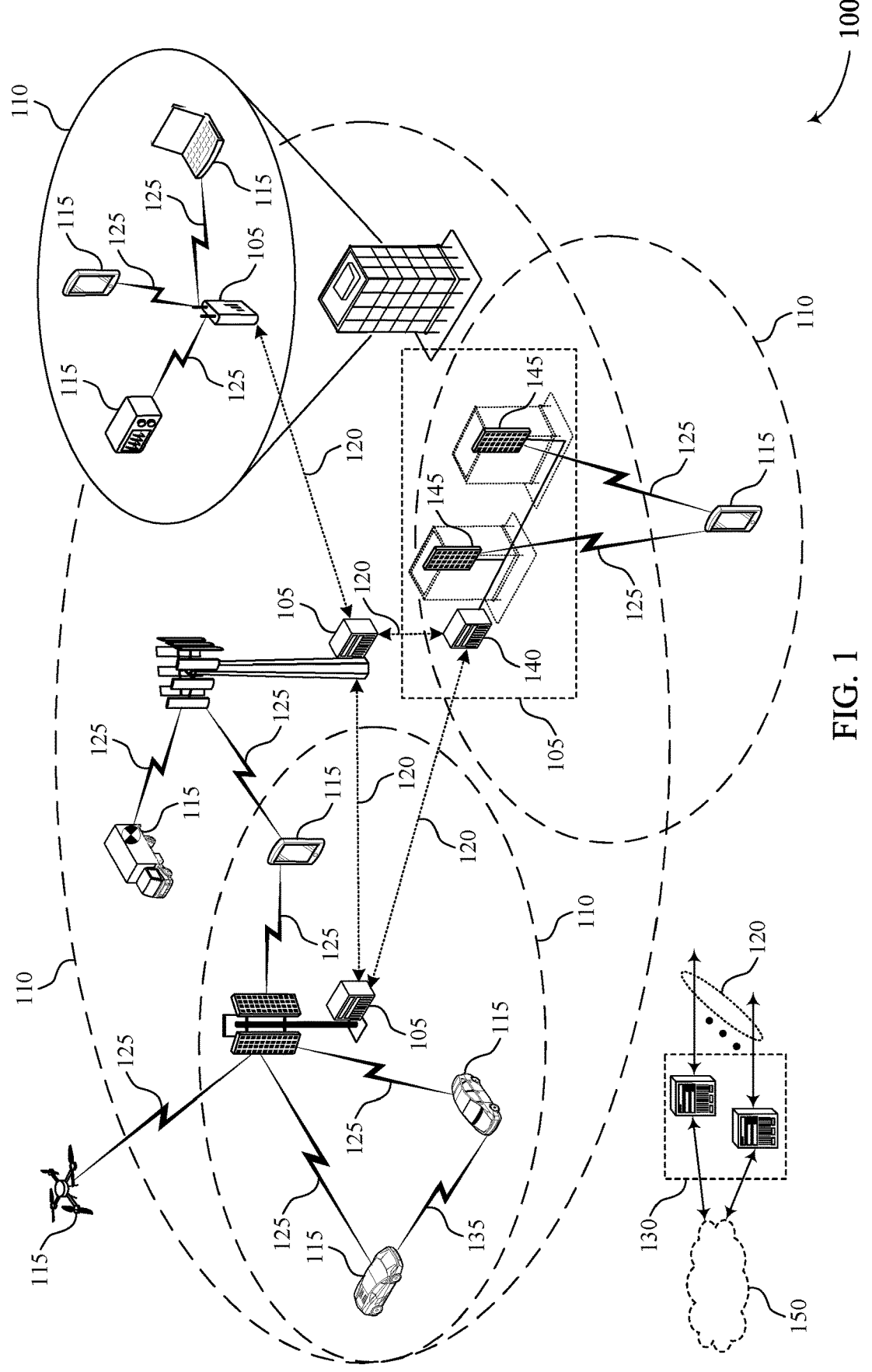
FIG. 1 illustrates an example of a system for wireless communications that supports demodulation reference signal (DMRS) multi-slot bundling indication in accordance with aspects of the present disclosure.

Demodulation reference signal (DMRS) bundling enhances coverage, improves communications for high-mobility rate devices, and the like. Generally, DMRS are transmitted in conjunction with data and/or control messages and are used for channel estimation to recover the data or control information. For example, a receiving device may detect one or more DMRS transmitted at the same time as the data and/or control messages, perform channel estimation on the channel based on the DMRS, and then recover the data or control information based on the channel estimation. DMRS bundling may include the receiving device bundling multiple DMRS across different slots, and then performing channel estimation based on the bundled DMRS. This technique provides a more modulated or smooth channel estimation for the channel over the different slots. While bundling DMRS has been beneficial when communicating data across a data channel (e.g., a physical downlink shared channel (PDSCH)), wireless communication systems typically do not provide a mechanism to allow a user equipment (UE) to be configured by the base station with DMRS bundling for a control channel (e.g., such as a physical downlink control channel (PDCCH)). Accordingly, such wireless communication systems do not support a configured DMRS bundling approach for control channel (e.g., grants) between the base station and UE.

Aspects of the disclosure are initially described in the context of wireless communications systems. Generally, the described techniques provide various techniques for a base station to transmit, provide for output, or otherwise convey an indication of a DMRS bundling configuration to a UE, with the UE using the bundled DMRS for channel estimation to demodulate grants received from the base station over a control channel. For example, the base station may select a DMRS bundling configuration for the UE to use for channel estimation for grants received over a control channel (e.g., a PDCCH). The DMRS bundling configuration may be based on the performance of the control channel, an interference level detected by the UE, a rate of interference level change experienced by the UE, and the like. Broadly, the DMRS bundling configuration may identify the slots from which the UE is to bundle DMRS for channel estimation of the control channel. The base station may transmit or otherwise provide an indication of the DMRS bundling configuration to the UE, which bundles the DRMS received over the control channel according to the DMRS bundling configuration. The UE then uses the bundled DMRS for decoding a grant from the base station. For example, the base station may provide the indication of the DMRS bundling configuration to the UE in a downlink control information (DCI) grant, a radio resource control (RRC) grant and/or message, and the like. The UE may implement the indicated DMRS bundling configuration until the base station indicates an updated DMRS bundling configuration (e.g., a new DMRS bundling configuration for the UE). The UE may receive, decode, or otherwise demodulate grants (e.g., DCI grants and/or RRC grants) received from the base station using the DMRS that were bundled according to the DMRS bundling configuration.

Aspects of the disclosure are further illustrated by and described with reference to apparatus diagrams, system diagrams, and flowcharts that relate to DMRS multi-slot bundling indication.

FIG. 1 illustrates an example of a wireless communications system 100 that supports DMRS multi-slot bundling indication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/$ $(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive, from a base station 105, an indication of a DMRS bundling configuration to be used by the UE 115 for demodulating a grant. The UE 115 may bundle a plurality of DMRSs received across a plurality of slots according to the DMRS bundling configuration. The UE 115 may perform channel estimation based at least in part on the bundled DMRSs. The UE 115 may demodulate the grant based at least in part on the channel estimation.

A base station 105 may select a DMRS bundling configuration for a UE 115 to use for demodulating a grant, the DMRS bundling configuration identifying a plurality of slots across which the UE 115 is to bundle DMRSs for performing channel estimation. The base station 105 may transmit, to the UE 115, an indication of the DMRS bundling configuration. The base station 105 may transmit the grant to the UE 115.

Figure 2:
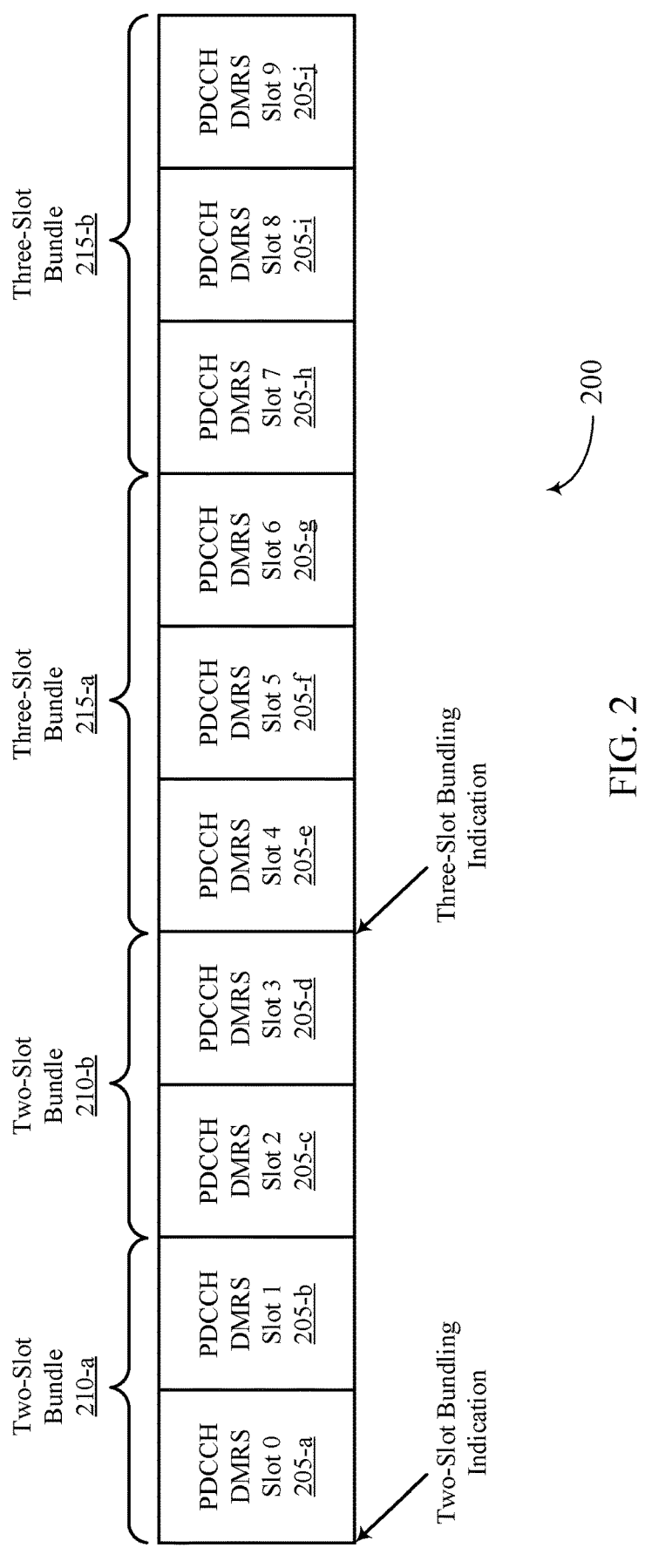
FIG. 2 illustrates an example of a bundling configuration that supports DMRS multi-slot bundling indication in accordance with aspects of the present disclosure.

FIG. 2 illustrates an example of a bundling configuration 200 that supports DMRS multi-slot bundling indication in accordance with aspects of the present disclosure. In some examples, bundling configuration 200 may implement aspects of wireless communications system 100. Aspects of bundling configuration 200 may be implemented by a base station and/or a UE, which may be examples of corresponding devices described herein.

Wireless communications may include data and/or control information being communicated across a wireless channel between a base station and UE. For example, a base station may transmit control information (e.g., a grant) over a control channel (e.g. such as a PDCCH) and data information over a data channel (e.g., such as a PDSCH) to the UE. In some aspects, the control information may be a grant scheduling the data transmission. For example, the grant may be communicated over time/frequency resources of the control channel, with the grant identifying resources for the data transmission. This may include the base station transmitting a DCI grant (e.g., a grant scheduling dynamic resources) and/or an RRC grant (e.g., a grant scheduling semi-persistent resources) to the UE scheduling the data transmission. The grant may be transmitted in the first, second, third, etc., symbols of a slot and schedule the data transmission for later symbols of the slot and/or for subsequent slots. The base station may also transmit DMRS at the same time as the control and data information. The DMRS is generally a reference signal transmitted at a known power level, frequency, etc. The UE detects a DMRS and performs channel estimation of the channel between the UE and base station based on the DMRS. For example, the UE may use the DMRS to perform channel estimation to determine channel performance properties such as a reference signal received power (RSRP), a reference signal strength indicator (RSSI), an interference level for the channel, a throughput rate supported by the channel, and the like. Accordingly, the UE may use the channel estimation to identify or otherwise determine such channel properties and then use those for decoding/demodulating the control and/or data information.

Broadly, resources for the control channel (e.g., PDCCH) may be associated with certain terminology. For example, a resource element groups (REG) may be equal to one resource block (RB) during an OFDM symbol. REGs may be defined in the physical resource domain. REGs within a control resource set (CORESET) may be numbered in increasing order and a time-first manner, starting with 0 for the first OFDM symbol and the lowest numbered RB in the CORESET. An REG bundle may consist of LB consecutive REGs. Of course, an REG bundle and a DMRS bundle are two different concepts. The LB may be the REG bundle size, e.g., 2, 3, or 6, and configured per CORESET. A REG bundle may be the smallest physical resource unit that can be allocated to PDCCH. A control channel element (CCE) may correspond to the physical resource of six REGs. CCEs are defined in the virtual resource domain. A PDCCH may be assigned with a number of L consecutive CCEs, where L is known as the aggregation level. In terms of the relationship between a REG bundle and a CCE, the CCE in the virtual resource domain is mapped to REG bundles in the physical resource domain by a CCE-to-REG mapping function, with the mapping function realizing distributive or sequential mapping. A CCE may be mapped to 3, 2, or 1 REG bundle(s) corresponding to REG bundle of size 2, 3, or 6, respectively and based on the aggregation level. PDCCH resource allocation procedures typically begin with continuously numbered CCEs in the CCE domain are assigned to the PDCCH, followed by the assigned CCEs being mapped to REG bundles in a physical time/frequency resource grid.

The control channel DMRS (e.g., PDCCH DMRS) may be transmitted in a narrowband mode or wideband mode, as configured per CORESET. In the wideband mode, DMRS are transmitted in the whole segment of contiguous RBs allocated to the CORESET if at least a REG bundle of the PDCCH is transmitted in the segment. The same precoder may be used in the segment of contiguous RBs, e.g., using RRC configuration precoderGranularity=allContiguousRBs. In the narrowband mode, DMRS may be transmitted in REG bundle(s) constituting the PDCCH. The same precoder may be used in the REG bundle of the PDCCH, e.g., using RRC configuration precoderGranularity=sameAsREG-bundle.

Typically, the UE may be allowed and/or configured to support DMRS bundling for a data channel (e.g., PDSCH DMRS bundling). For example, the UE may bundle PDSCH DMRS across one or more slots, and then use the bundled DMRS for channel estimation for the data transmission. However, wireless communication systems are not configured to support PDCCH DMRS bundling. That is, currently there is no technique available for a base station to configure a UE to support PDCCH DMRS bundling.

Broadly, PDCCH DMRS bundling may include time domain bundling. That is, PDCCH DMRS may be coherently transmitted over different time instances (e.g., over different slots). At the receiver (e.g., a UE) the DMRS over different time instances can be coherently filtered to enhance the accuracy of the channel estimation. This may provide numerous gains, such as coverage enhancement, high mobility, low DMRS overhead and peak throughput, and the like. In some aspects, PDCCH DMRS bundling may be implemented for a channel with fast time/frequency variance properties, e.g., to ensure high reliability. In this situation, a UE attempting to autonomously try different DMRS bundling configurations over different slots to demodulate PDCCH DMRS may result in a particularly high processing complexities at the UE. Accordingly, aspects of the described techniques provide a mechanism where base station can explicitly indicate a suggested bundling slot number (e.g., a DMRS bundling configuration) to the UE, which may reduce complexity and improve channel estimation/demodulation.

For example, the base station may identify or otherwise select a DMRS bundling configuration (e.g., PDCCH DMRS bundling) for a UE to use for demodulating a grant (e.g., a DCI and/or RRC grant). Broadly, the DMRS bundling configuration may signal or otherwise identify a plurality of slots across which the UE is to bundle PDCCH DMRS for performing channel estimation. The base station may transmit, provide for output, or otherwise convey an indication of the DMRS bundling configuration to the UE, e.g., in a DCI grant, RRC grant, and the like. The indicated DMRS bundling configuration may be effective from the time the UE receives the indication until the UE receives another indication identifying a different or updated DMRS bundling configuration.

As discussed, the indication of the DMRS bundling configuration may be conveyed in a DCI grant and/or a RRC grant. For example, the DCI and/or RRC grant may include a field, information element, etc., that indicates the slot number(s) for PDCCH DMRS bundling. For example, the DCI and/or RRC grant may include a PDCCH_DMRS-_bundling_num$_{DCI}$ or PDCCH_DMRS_bundling_num$_{RRC}$ field, respectively, using one, two, or more bits that indicate the slot numbers. In one non-limiting example, the indication may use two bits and be set to "00" to indicate one slot PDCCH DMRS bundling, "01" to indicate two slot PDCCH DMRS bundling, "10" to indicate three slot PDCCH DMRS bundling, or "11" to indicate four slot PDCCH DMRS bundling. Other configurations may also be used to convey the indication explicitly and/or implicitly. Thus, the indication of the DMRS bundling configuration may broadly indicate the number of slots in which the UE is to bundle PDCCH DMRS. In some aspects, the indication of the DMRS bundling configuration may be conveyed in a UE-specific grant and/or a common grant.

In some aspects, the base station may select the DMRS bundling configuration for the UE based on feedback messages. For example, the UE may periodically or on-demand transmit feedback messages (e.g., channel state information (CSI) feedback messages) to the base station indicating channel performance properties. In some aspects, the feedback messages may indicate that the channel performance for the channel satisfies a threshold, e.g., has low RSRP/RSSI, low throughput, high interference, etc. The base station may select the DMRS bundling configuration based on one or more feedback messages (e.g., based on the channel performance). The base station may select the DMRS bundling configuration based on a trend or rate-of-change for the channel properties, e.g., determine that the rate-of-change satisfies the threshold.

In some aspects, the base station may select the DMRS bundling configuration based on the UE capability message. For example, the UE may transmit, provide for output, or otherwise convey an indication of a UE capability message to the base station. The UE capability message may indicate that the UE supports PDCCH DMRS bundling across a plurality of slots. In some aspects, the UE capability message may simply indicate that the UE supports PDCCH DMRS bundling and/or that it supports PDCCH DMRS bundling across a certain number of slots.

The UE may receive the indication from the base station and identify the DMRS bundling configuration. Accordingly, the UE may bundle a plurality of DMRSs over a plurality of slots according to the DMRS bundling configuration. For example and referring to bundling configuration 200, the UE may initially receive a first indication of a DMRS bundling configuration that includes bundling DMRS across two slots 205. For example, the UE may receive the indication of the DMRS bundling configuration in a DCI grant and/or RRC grant indicating that two-slot bundling is configured for the UE in the DMRS bundling configuration. Therefore, the UE may bundle DMRSs during slots 205-a and 205-b to create a two-slot bundle 210-a. The UE may again bundle DMRSs during slots 205-c and 205-d to create another two-slot bundle 210-b. The UE may perform channel estimation based on the bundled DMRSs (e.g., the two-slot bundles 210), and use the channel estimation to demodulate any grants received during slots 205-a through 205-d.

The UE may receive a second indication of a DMRS bundling configuration (e.g., a different or updated DMRS bundling configuration) that includes bundling DMRS across three slots 205 (e.g., three-slot bundling). For example, the UE may receive the indication of the DMRS bundling configuration in a DCI grant and/or RRC grant indicating the three-slot bundling. Therefore, the UE may bundle DMRSs during slots 205-e, 205-f, and 205-g to create a three-slot bundle 215-a. The UE may again bundle DMRSs during slots 205-h, 205-i, and 205-j to create another three-slot bundle 215-b. The UE may perform channel estimation based on the bundled DMRSs (e.g., the three-slot bundles 215), and use the channel estimation to demodulate any grants received during slots 205-e through 205-j.

In some aspects, the second indication of the DMRS bundling configuration may be provided by the base station autonomously (e.g., based on monitoring various feedback messages from the UE). However, in some examples the second indication of the DMRS bundling configuration may be provided in response to a request from the UE. For example, the UE may determine that the two-slot DMRS bundling configuration may be insufficient to allow the UE to successfully demodulate a grant during slots 205-a through 205-d. Accordingly, the UE may transmit or otherwise convey an indication of a request for an updated DMRS bundling configuration to the base station. The request may carry or convey an indication that the UE was unsuccessful at demodulating one or more grants according to the two-slot DMRS bundling configuration. Accordingly, the base station may select an updated DMRS bundling configuration for the UE (e.g., the three-slot DMRS bundling configuration) and transmit an indication of the updated DMRS bundling configuration to the UE.

In some aspects, the UE may begin DMRS bundling upon receiving the indication of the DMRS bundling configuration and/or based on detecting a valid grant during a slot 205. That is, the UE may begin DMRS bundling as discussed above in response to receiving the indication of the DMRS bundling configuration. Additionally or alternatively, the UE may receive the indicated DMRS bundling configuration, then may wait to begin bundling DMRS until the UE detects a valid DCI and/or RRC grant. Based on the detected valid grant, the UE may begin bundling DMRS according to the indicated DMRS bundling configuration in order to demodulate the grant.

Thus, the UE may bundle a plurality of DMRSs during a first subset of slots 205 (e.g., slots 205-a and 205-b) and a second subset of slots 205 (e.g., slots 205-c and 205-d) according to the DMRS bundling configuration. In the example illustrated in bundling configuration 200, the slots 205 in the first subset of slots are not overlapping with the slots 205 in the second subset of slots. This example DMRS bundling configuration may reduce the processing complexity at the UE.

Accordingly, bundling configuration 200 illustrates an example of a low-complexity mode for DMRS bundling that includes an indicated buffer case. The DMRS bundling configuration illustrated in bundling configuration 200 includes the bundled processing slot set starting from the slot 205 where the UE detects the valid DCI or RRC grant indicating the DMRS bundling configuration.

Figure 3:
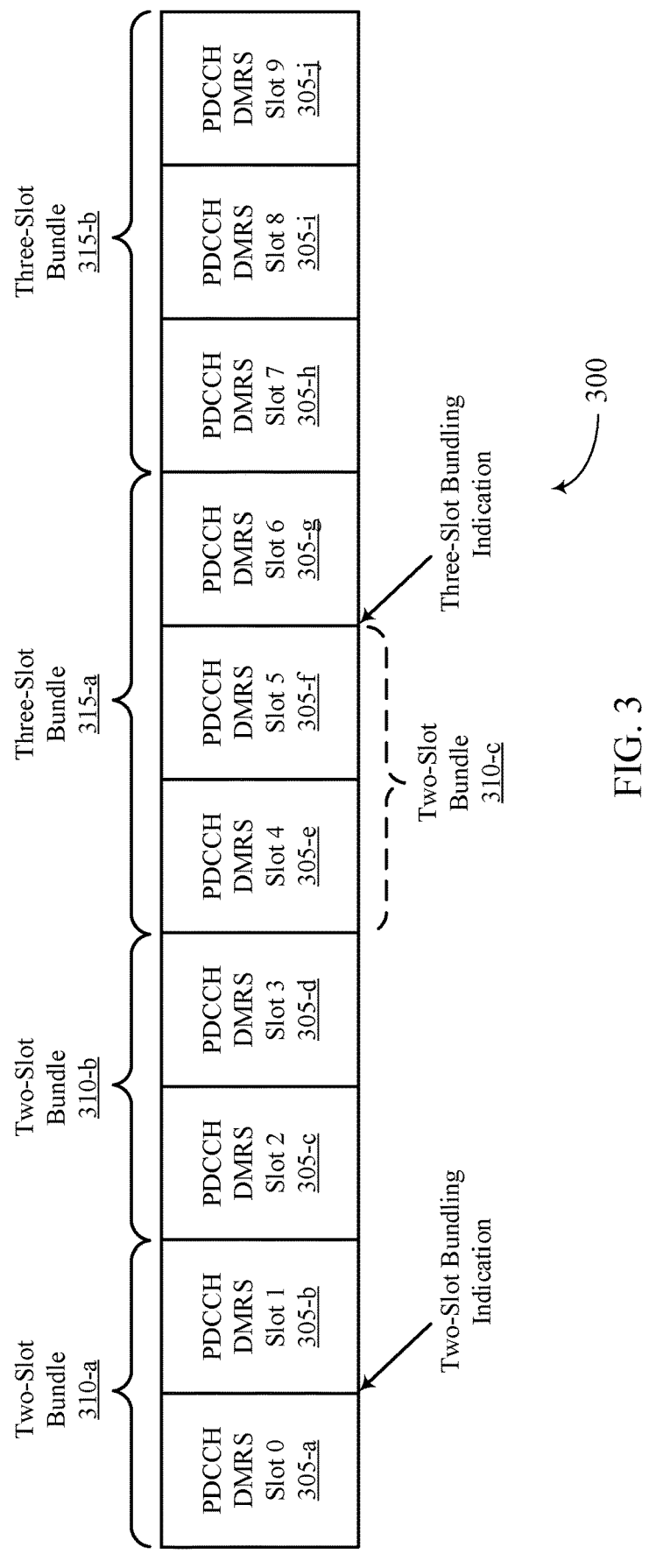
FIG. 3 illustrates an example of a bundling configuration that supports DMRS multi-slot bundling indication in accordance with aspects of the present disclosure.

FIG. 3 illustrates an example of a bundling configuration 300 that supports DMRS multi-slot bundling indication in accordance with aspects of the present disclosure. In some examples, bundling configuration 300 may implement aspects of wireless communications system 100 and/or bundling configuration 200. Aspects of bundling configuration 300 may be implemented by a base station and/or UE, which may be examples of corresponding devices described herein.

As discussed above, aspects of the described techniques include a base station identifying or otherwise selecting a DMRS bundling configuration for a UE to use for performing channel estimation for a control channel. The base station may transmit or otherwise provide an indication of the DMRS bundling configuration to the UE in a UE-specific or common grant (e.g., DCI grant and/or RRC grant). The UE may receive the indication and begin bundling PDCCH DMRS according to the DMRS bundling configuration. The UE may use the bundled PDCCH DMRS to perform channel estimation when demodulating grants from the base station.

Bundling configuration 300 illustrates an example of a low-complexity DMRS bundling mode with a pre-indicated buffer case. The bundled-processing slot set may be without overlap (e.g., is non-overlapping) to reduce the processing complexity at the UE. The bundled-processing slot set starts before the slot where the UE detects a valid DCI or RRC grant, e.g., the UE buffers the DMRS received before receiving the indication of the DMRS bundling configuration. The pre-indicated buffer reception status (or buffer reception mode) may be enabled via higher layer signaling, such as RRC signaling. The pre-indicated buffer reception status may be received separately and before the indication of the DMRS bundling configuration is received. Accordingly, the UE may receive a higher layer signal identifying the buffer reception mode and begin buffering PDCCH DMRS accordingly.

The UE may therefore buffer DMRS received during slot 305-*a*. At the beginning of the slot 305-*b*, the UE may receive the indication of the DMRS bundling configuration from the base station. In this example, the DMRS bundling configuration received during slot 305-*b* includes a two-slot DMRS bundling configuration. Accordingly, the UE may bundle the DMRS receive during slot 305-*b* with the buffered DMRS received during slot 305-*a* to create a two-slot bundle 310-*a*. The UE may continue this process based on the indicated DMRS bundling indication to create a two-slot bundle 310-*b* from DMRS received during slots 305-*c* and 305-*d*. The UE may create a two-slot bundle 310-*c* from DMRS received during slots 305-*e* and 305-*f*. The UE may receive one or more grants during slots 305-*a* through 305-*f* and use the corresponding two-slot bundle 310 to demodulate the grant(s).

At the beginning of the slot 305-*g*, the UE may receive a second or updated indication of the DMRS bundling configuration from the base station. In this example, the DMRS bundling configuration received during slot 305-*g* includes a three-slot DMRS bundling configuration. Accordingly, the UE may bundle the buffered DMRS received during slots 305-*e* and 305-*f* with the DMRS received during slot 305-*g* to create a three-slot bundle 315-*a*. The UE may continue this process based on the indicated updated or new DMRS bundling configuration to create a three-slot bundle 315-*b* from DMRS received during slots 305-*h* through 305-*j*. The UE may receive one or more grants during slots 305-*e* through 305-*j* and use the corresponding three-slot bundle 315 to demodulate the grant(s).

Figure 4:
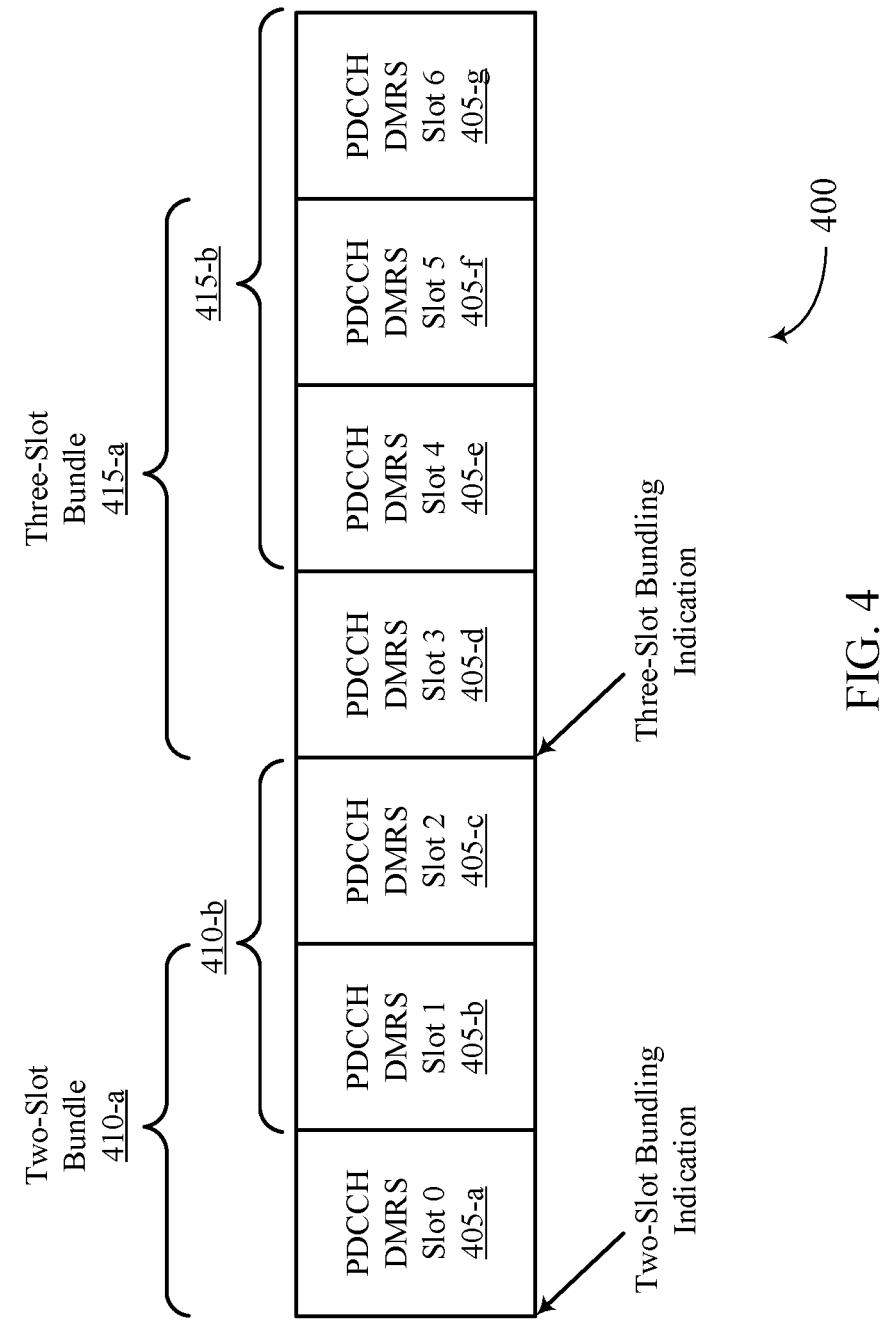
FIG. 4 illustrates an example of a bundling configuration that supports DMRS multi-slot bundling indication in accordance with aspects of the present disclosure.

FIG. 4 illustrates an example of a bundling configuration 400 that supports DMRS multi-slot bundling indication in accordance with aspects of the present disclosure. In some examples, bundling configuration 400 may implement aspects of wireless communications system 100 and/or bundling configurations 200 and/or 300. Aspects of bundling configuration 400 may be implemented by a base station and/or UE, which may be examples of corresponding devices described herein.

As discussed above, aspects of the described techniques include a base station identifying or otherwise selecting a DMRS bundling configuration for a UE to use for performing channel estimation for a control channel. The base station may transmit or otherwise provide an indication of the DMRS bundling configuration to the UE in a UE-specific or common grant (e.g., DCI grant and/or RRC grant). The UE may receive the indication and begin bundling PDCCH DMRS according to the DMRS bundling configuration. The UE may use the bundled PDCCH DMRS to perform channel estimation when demodulating grants from the base station.

Bundling configuration 400 illustrates an example of a more complex (at least to some degree) DMRS bundling mode with an indicated buffer case. The bundled-processing slot set may be with overlap (e.g., is at least partially overlapping) to improve reliability at the UE. The bundled-processing slot set starts from the slot where the UE detects a valid DCI or RRC grant.

At the beginning of slot 405-*a*, the UE may receive the indication of the DMRS bundling configuration from the base station. In this example, the DMRS bundling configuration received during slot 405-*a* includes a two-slot DMRS bundling configuration. Accordingly, the UE may bundle the DMRS received during slot 405-*a* and slot 405-*b* to create a two-slot bundle 410-*a*. The UE may continue this process based on the indicated DMRS bundling configuration to create a two-slot bundle 410-*b* from DMRS received during slots 405-*b* and 405-*c*. Accordingly, the two-slot bundle 410-*a* includes at least one overlapping slot 405-*b* with respect to the two-slot bundle 410-*b*. The UE may receive one or more grants during slots 405-*a* through 405-*c* and use the corresponding two-slot bundle 410 to demodulate the grant(s).

At the beginning of the slot 405-*d*, the UE may receive a second or updated indication of the DMRS bundling configuration from the base station. In this example, the DMRS bundling configuration received during slot 405-*d* includes a three-slot DMRS bundling configuration. Accordingly, the UE may bundle the DMRS received during slots 405-*d* through 405-*f* to create a three-slot bundle 415-*a*. The UE may continue this process based on the indicated updated or new DMRS bundling configuration to create a three-slot bundle 415-*b* from DMRS received during slots 405-*e* through 405-*g*. Accordingly, the three-slot bundle 415-*a* includes overlapping slots 405-*e* and 405-*f* with respect to the three-slot bundle 415-*b*. The UE may receive one or more grants during slots 405-*d* through 405-*g* and use the corresponding three-slot bundle 415 to demodulate the grant(s).

Figure 5:
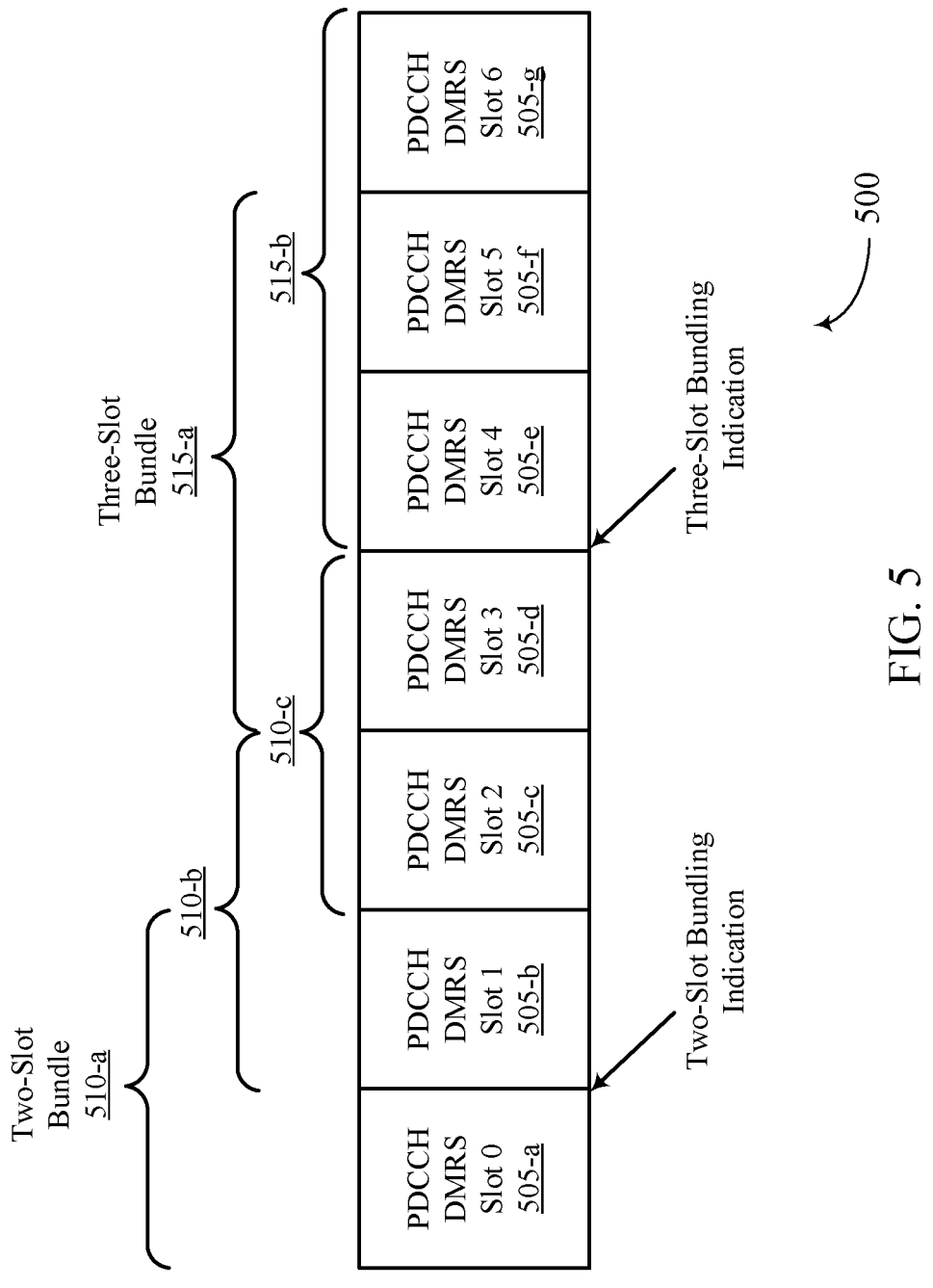
FIG. 5 illustrates an example of a bundling configuration that supports DMRS multi-slot bundling indication in accordance with aspects of the present disclosure.

FIG. 5 illustrates an example of a bundling configuration 500 that supports DMRS multi-slot bundling indication in accordance with aspects of the present disclosure. In some examples, bundling configuration 500 may implement aspects of wireless communications system 100 and/or bundling configurations 200, 300, and/or 400. Aspects of bundling configuration 500 may be implemented by a base station and/or UE, which may be examples of corresponding devices described herein.

As discussed above, aspects of the described techniques include a base station identifying or otherwise selecting a DMRS bundling configuration for a UE to use for performing channel estimation for a control channel. The base station may transmit or otherwise provide an indication of the DMRS bundling configuration to the UE in a UE-specific or common grant (e.g., DCI grant and/or RRC grant). The UE may receive the indication and begin bundling PDCCH DMRS according to the DMRS bundling configuration. The UE may use the bundled PDCCH DMRS to perform channel estimation when demodulating grants from the base station.

Bundling configuration 500 illustrates an example of a more complex (at least to some degree) DMRS bundling mode with a pre-indicated buffer case. The bundled-processing slot set may be with overlap (e.g., is at least partially overlapping) to improve reliability at the UE. The bundled-processing slot set starts before the slot where the UE detects a valid DCI or RRC grant, e.g., the UE buffers the DMRS received before receiving the indication of the DMRS bundling configuration. The pre-indicated buffer reception status (or buffer reception mode) may be enabled via higher layer signaling, such as RRC signaling. The pre-indicated buffer reception status may be received separately and before the indication of the DMRS bundling configuration is received. Accordingly, the UE may receive a higher layer signal identifying the buffer reception mode and begin buffering PDCCH DMRS accordingly.

The UE may therefore buffer DMRS received during slot 505-*a*, e.g., based on the indicated buffer reception mode. At the beginning of the slot 505-*b*, the UE may receive the indication of the DMRS bundling configuration from the base station. In this example, the DMRS bundling configuration received during slot 505-*b* includes a two-slot DMRS bundling configuration. Accordingly, the UE may bundle the DMRS receive during slot 505-*b* with the buffered DMRS received during slot 505-*a* to create a two-slot bundle 510-*a*. The UE may continue this process based on the indicated DMRS bundling configuration to create a two-slot bundle 510-*b* from DMRS received during slots 505-*b* and 505-*c*. The UE may create a two-slot bundle 510-*c* from DMRS received during slots 505-*c* and 505-*d*. The UE may receive one or more grants during slots 505-*a* through 505-*d* and use the corresponding two-slot bundle 510 to demodulate the grant(s).

At the beginning of the slot 505-*e*, the UE may receive a second or updated indication of the DMRS bundling configuration from the base station. In this example, the DMRS bundling configuration received during slot 505-*e* includes a three-slot DMRS bundling configuration. Accordingly, the UE may bundle the buffered DMRS received during slot 505-*d* with the DMRS received during slots 505-*e* and 505-*f* to create a three-slot bundle 515-*a*. The UE may continue this process based on the indicated updated or new DMRS bundling configuration to create a three-slot bundle 515-*b* from DMRS received during slots 505-*e* through 505-*g*. The UE may receive one or more grants during slots 505-*d* through 505-*g* and use the corresponding three-slot bundle 515 to demodulate the grant(s).

Figure 6:
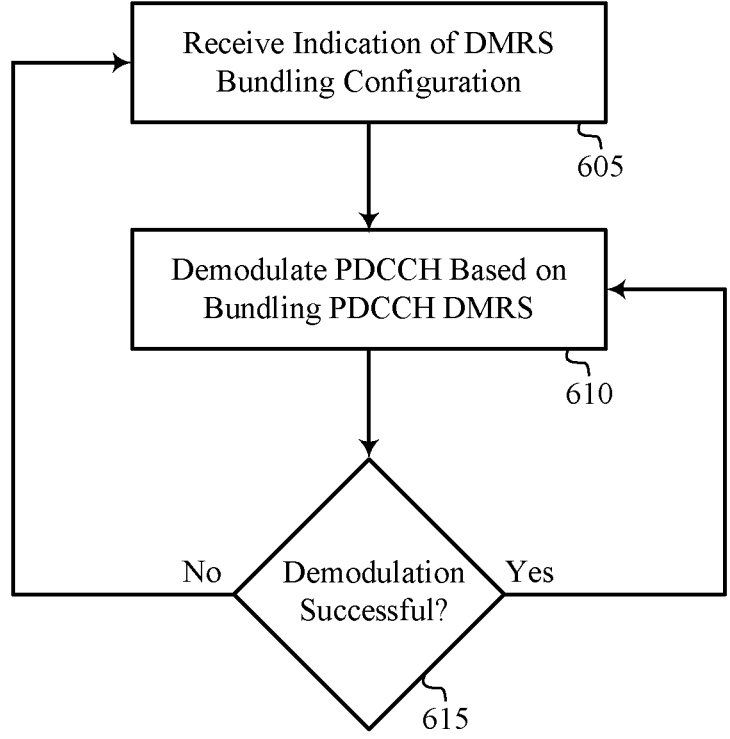
FIG. 6 illustrates an example of a method that supports DMRS multi-slot bundling indication in accordance with aspects of the present disclosure.

FIG. 6 illustrates an example of a method 600 that supports DMRS multi-slot bundling indication in accordance with aspects of the present disclosure. In some examples, method 600 may implement aspects of wireless communications system 100 and/or bundling configurations 200, 300, 400, and/or 500. Aspects of method 600 may be implemented by a base station and/or UE, which may be examples of the corresponding devices described herein.

At 605, a UE may receive, from a base station, an indication of a DMRS bundling configuration to be used by the UE for demodulating a grant. The indication may be received in a UE-specific and/or common grant, such as a DCI grant and/or RRC grant. The indication may include bit(s), a field, etc., indicating that DMRS bundling is configured for the UE. The indication may identify the number of slots over which the UE is to bundle PDCCH DMRS, e.g., a one slot bundle, a two-slot bundle, a three-slot bundle, and the like. In some examples (e.g., when the UE is to buffer one or more DMRS slots), the UE may also receive an indication of buffer reception mode identifying slots over which the UE is to buffer DMRS for subsequent DMRS bundling. The indication of the buffer reception mode may be received in a RRC grant and/or other higher-layer signaling. If a served number of UEs served by the base station have a similar channel property, the indication of the DMRS bundling configuration may be provided in a cell-common RRC information/message. If the UEs served by the base station have different channel properties, the indication of the DMRS bundling configuration may be provided in a UE-specific DCI.

In some aspects, the UE may receive the indication of the DMRS bundling configuration based on a UE capability message. That is, the UE capability message may indicate that the UE supports DMRS bundling, a number of slot over which the UE supports DMRS bundling, and the like. In some aspects, the UE can report to the base station a suggested or supported PDCCH DMRS bundling slot number, e.g., the number of slots over which the UE can bundle DMRS.

In some aspects, the UE may receive the indication of the DMRS bundling configuration based on feedback message(s). That is, the UE may transmit feedback message(s) (e.g., CSI feedback messages) to the base station. One or more of the feedback messages may indicate channel performance parameters for the channel between the UE and base station. In some aspects, the indicated channel performance parameters may satisfy a threshold, which may trigger the base station to select and indicate the DMRS bundling configuration to the UE. For example, the channel performance parameters may indicate that the RSRP, RSSI, throughput, interference level, etc., have reached a level that satisfies the threshold.

At 610, the UE may demodulate PDCCH (e.g., grant(s)) based on the indicated DMRS bundling configuration. For example, the UE may bundle DMRS across the plurality of slots indicated in the DMRS bundling configuration. The UE may then perform channel estimation based on the bundled DMRS. The UE may then use the channel estimation to demodulate the grant(s).

In some aspects, this may include the UE bundling the DMRSs during a set of slots beginning with the first slot (e.g., the slot where the indication of the DMRS bundling configuration is received) and one or more subsequent slots (e.g., during a number of slots identified in the DMRS bundling configuration). In some aspects, this may include the UE bundling the DMRSs during a set of slots that begin before the first slot (e.g., the UE may buffer one or more slots before receiving the indication of the DMRS bundling configuration) and one or more subsequent slots. For example, the UE may receive an indication of a buffering reception mode from the base station in an RRC message/grant identifying the slots in which the UE is to buffer the DMRSs. The slots over which the DMRSs are bundled may be overlapping or non-overlapping slots.

At 615, the UE may determine whether demodulating the grants using the bundled DMRS was successful. If so, the UE may continue to demodulate PDCCH (e.g., grant(s)) according to the initially indicated DMRS bundling configuration at 610. If not, the UE may transmit a request to the base station requesting an updated DMRS bundling configuration. The base station may respond by transmitting an indication of another (e.g., updated) DMRS bundling configuration to the UE. In some aspects, the UE may configure the request to identify the number of slots being requested in the updated DMRS bundling configuration. In some aspects, the UE may simply indicate that the demodulation was unsuccessful. In this situation, the base station may autonomously select the number of slots to be bundled in the updated DMRS bundling configuration.

Figure 7:
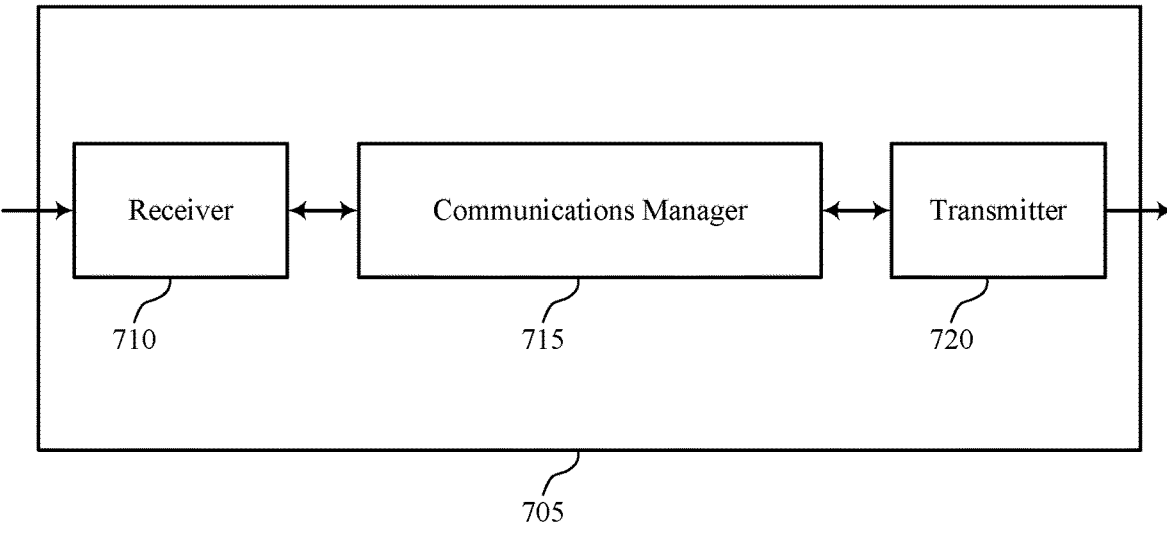
FIGS. 7 and 8 show block diagrams of devices that support DMRS multi-slot bundling indication in accordance with aspects of the present disclosure.

FIG. 7 shows a block diagram 700 of a device 705 that supports DMRS multi-slot bundling indication in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to DMRS multi-slot bundling indication, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, an indication of a DMRS bundling configuration to be used by the UE for demodulating a grant, bundle a set of DMRSs received across a set of slots according to the DMRS bundling configuration, perform channel estimation based on the bundled DMRSs, and demodulate the grant based on the channel estimation. The communications manager 715 may be an example of aspects of the communications manager 1010 described herein.

The communications manager 715, or its sub-components, may be implemented in hardware, code (e.g., software) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
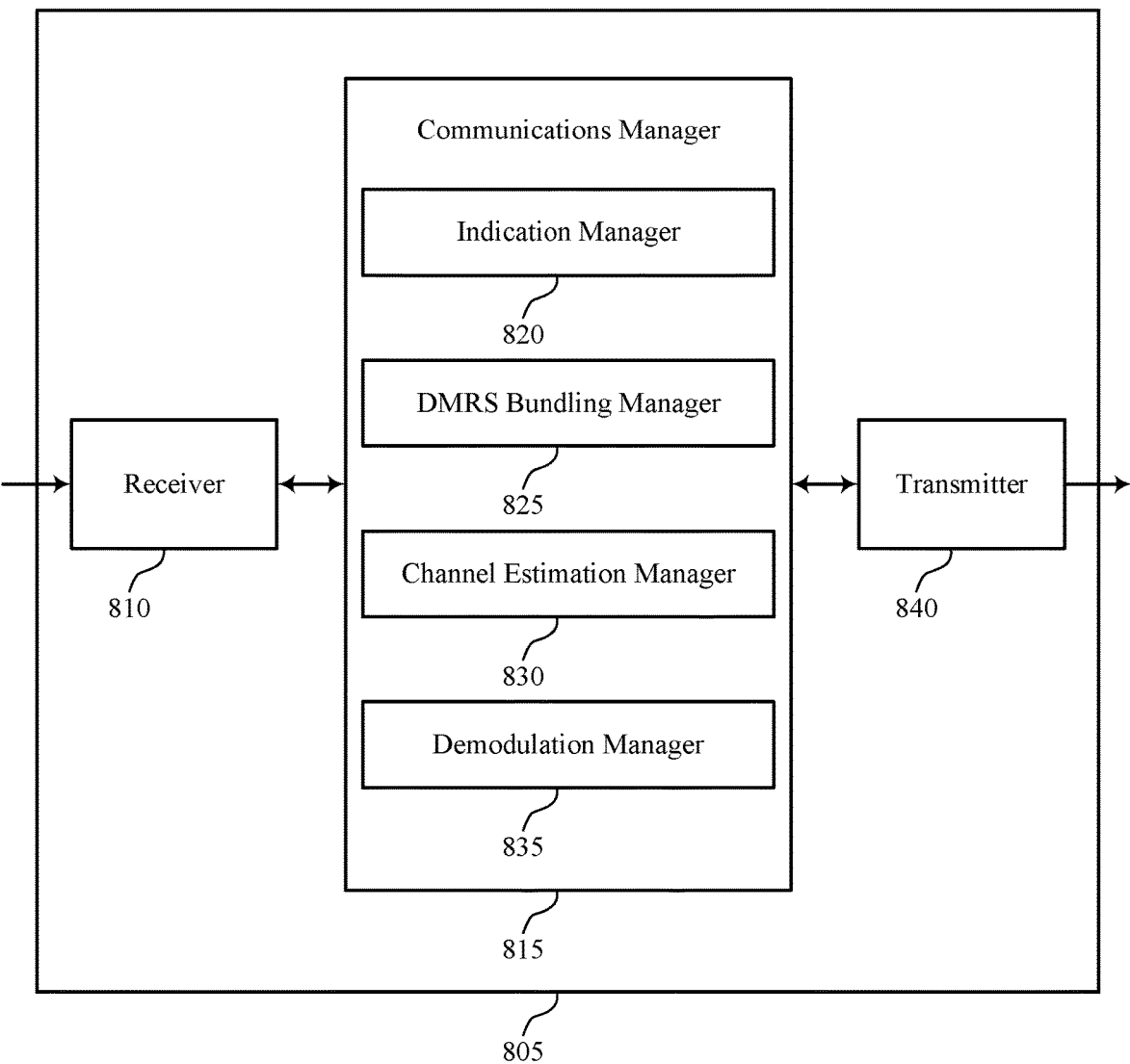

FIG. 8 shows a block diagram 800 of a device 805 that supports DMRS multi-slot bundling indication in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to DMRS multi-slot bundling indication, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include an indication manager 820, a DMRS bundling manager 825, a channel estimation manager 830, and a demodulation manager 835. The communications manager 815 may be an example of aspects of the communications manager 1010 described herein.

The indication manager 820 may receive, from a base station, an indication of a DMRS bundling configuration to be used by the UE for demodulating a grant.

The DMRS bundling manager 825 may bundle a set of DMRSs received across a set of slots according to the DMRS bundling configuration.

The channel estimation manager 830 may perform channel estimation based on the bundled DMRSs.

The demodulation manager 835 may demodulate the grant based on the channel estimation.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
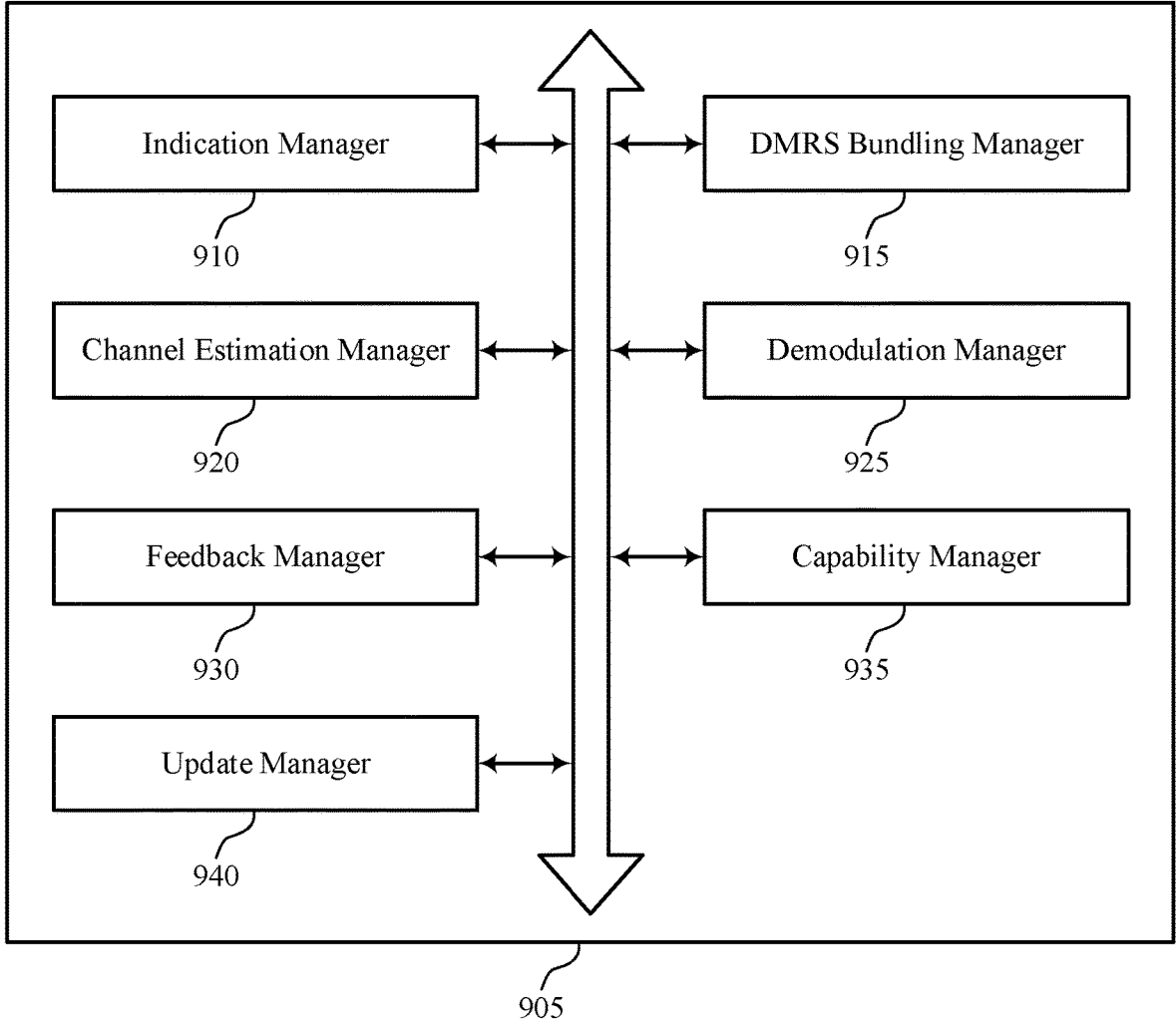
FIG. 9 shows a block diagram of a communications manager that supports DMRS multi-slot bundling indication in accordance with aspects of the present disclosure.

FIG. 9 shows a block diagram 900 of a communications manager 905 that supports DMRS multi-slot bundling indication in accordance with aspects of the present disclosure. The communications manager 905 may be an example of aspects of a communications manager 715, a communications manager 815, or a communications manager 1010 described herein. The communications manager 905 may include an indication manager 910, a DMRS bundling manager 915, a channel estimation manager 920, a demodulation manager 925, a feedback manager 930, a capability manager 935, and an update manager 940. Each of these modules may communicate, directly or indirectly, with one another (e.g., via one or more buses).

The indication manager 910 may receive, from a base station, an indication of a DMRS bundling configuration to be used by the UE for demodulating a grant. In some cases, the indication is received in at least one of a DCI grant, or a RRC grant, or a combination thereof. In some cases, the indication is received in at least one of a UE-specific grant, or a common grant, or a combination thereof.

The DMRS bundling manager 915 may bundle a set of DMRSs received across a set of slots according to the DMRS bundling configuration. In some examples, the DMRS bundling manager 915 may bundle the set of the DMRSs during a set of slots according to the DMRS bundling configuration, where the set of slots begin with the first slot and include one or more subsequent slots. In some examples, the DMRS bundling manager 915 may bundle the set of the DMRSs during a set of slots according to the DMRS bundling configuration, where the set of slots begin with one or more previous slots before the first slot and include at least the first slot.

In some examples, the DMRS bundling manager 915 may receive an indication of a buffering reception mode bundling the set of DMRSs in a RRC grant. In some examples, the DMRS bundling manager 915 may bundle the set of the DMRSs during a first subset of slots according to the DMRS bundling configuration. In some examples, the DMRS bundling manager 915 may bundle the set of the DMRSs during a second subset of slots according to the DMRS bundling configuration. In some examples, the DMRS bundling manager 915 may bundle the set of DMRSs is based on detecting the grant. In some cases, the first subset of slots at least partially overlaps with the second subset of slots. In some cases, the first subset of slots are non-overlapping with the second subset of slots.

The channel estimation manager 920 may perform channel estimation based on the bundled DMRSs.

The demodulation manager 925 may demodulate the grant based on the channel estimation.

The feedback manager 930 may transmit one or more feedback messages to a base station indicating that a channel performance for a channel between the base station and UE satisfies a threshold, where the indication of the DMRS bundling configuration is received based on the one or more channel feedback messages.

The capability manager 935 may transmit a capability message indicating support for receiving the indication of the DMRS bundling configuration. In some cases, the capability message indicates a number of slots that the UE supports bundling.

The update manager 940 may determine that the demodulation of the grant was unsuccessful. In some examples, update manager 940 may transmit a request for an updated DMRS bundling configuration based on the unsuccessful demodulation of the grant.

Figure 10:
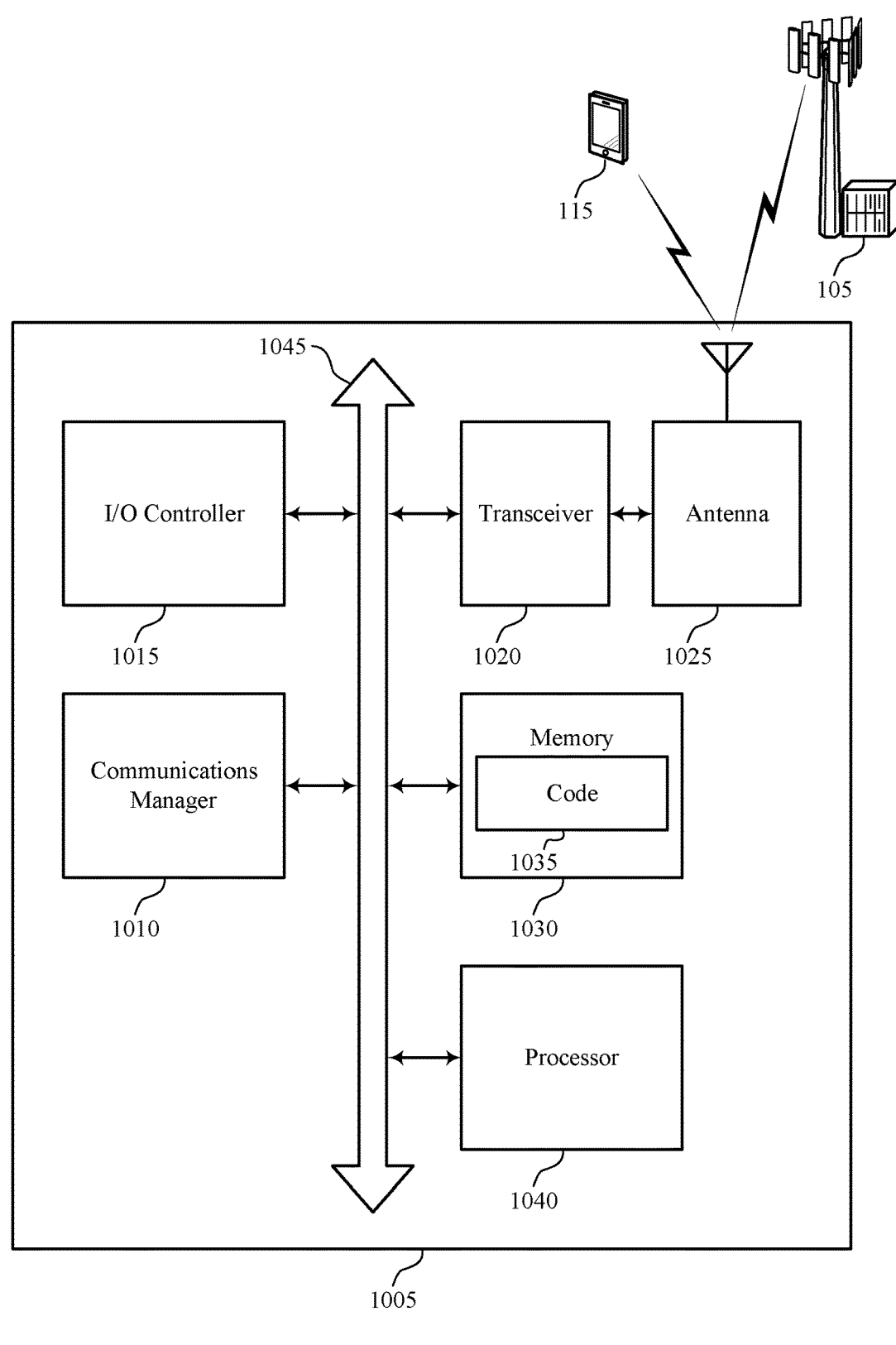
FIG. 10 shows a diagram of a system including a device that supports DMRS multi-slot bundling indication in accordance with aspects of the present disclosure.

FIG. 10 shows a diagram of a system 1000 including a device 1005 that supports DMRS multi-slot bundling indication in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive, from a base station, an indication of a DMRS bundling configuration to be used by the UE for demodulating a grant, bundle a set of DMRSs received across a set of slots according to the DMRS bundling configuration, perform channel estimation based on the bundled DMRSs, and demodulate the grant based on the channel estimation.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting DMRS multi-slot bundling indication).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

FIG. 11 shows a block diagram 1100 of a device 1105 that supports DMRS multi-slot bundling indication in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to DMRS multi-slot bundling indication, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may select a DMRS bundling configuration for a UE to use for demodulating a grant, the DMRS bundling configuration identifying a set of slots across which the UE is to bundle DMRSs for performing channel estimation, transmit, to the UE, an indication of the DMRS bundling configuration, and transmit the grant to the UE. The communications manager 1115 may be an example of aspects of the communications manager 1410 described herein.

The communications manager 1115, or its sub-components, may be implemented in hardware, code (e.g., software) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
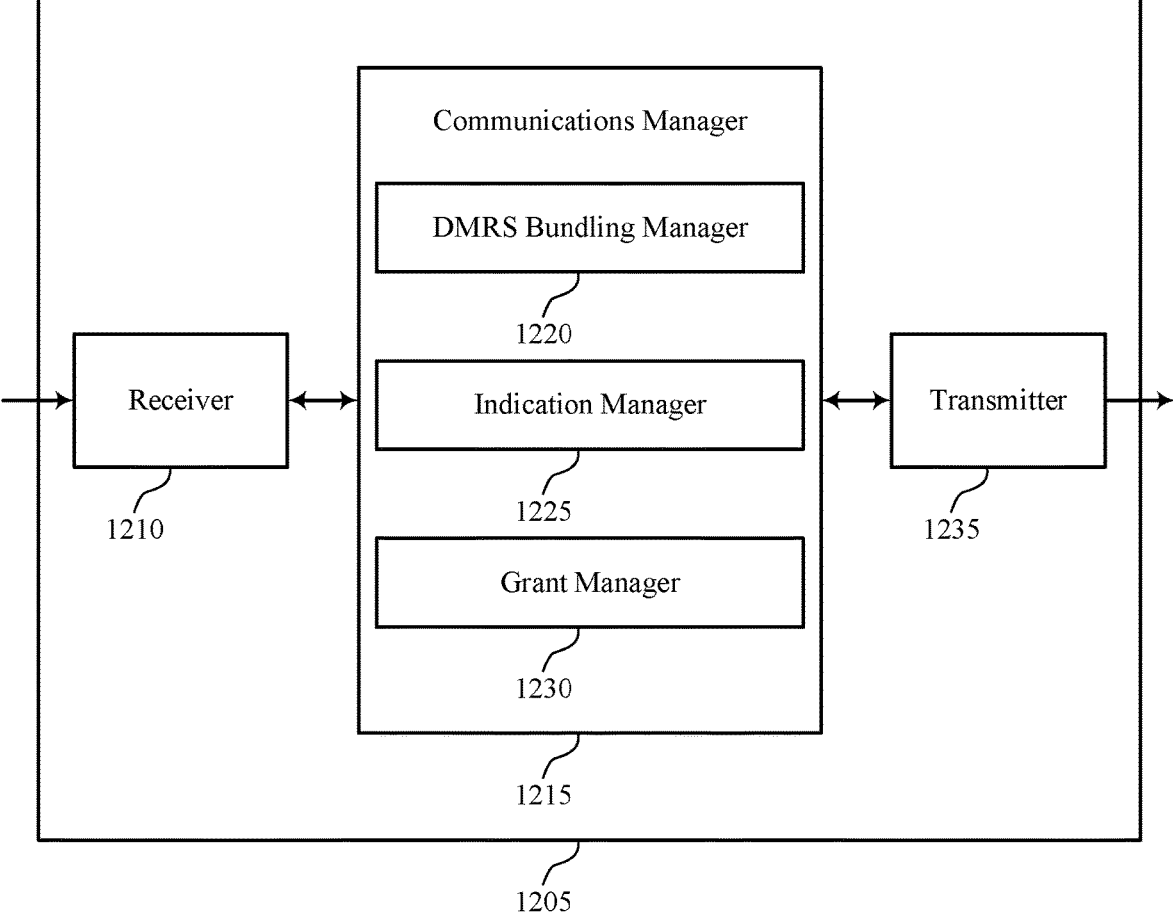

FIG. 12 shows a block diagram 1200 of a device 1205 that supports DMRS multi-slot bundling indication in accordance with aspects of the present disclosure. The device 1205 may be an example of aspects of a device 1105, or a base station 105 as described herein. The device 1205 may include a receiver 1210, a communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to DMRS multi-slot bundling indication, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a DMRS bundling manager 1220, an indication manager 1225, and a grant manager 1230. The communications manager 1215 may be an example of aspects of the communications manager 1410 described herein.

The DMRS bundling manager 1220 may select a DMRS bundling configuration for a UE to use for demodulating a grant, the DMRS bundling configuration identifying a set of slots across which the UE is to bundle DMRSs for performing channel estimation.

The indication manager 1225 may transmit, to the UE, an indication of the DMRS bundling configuration.

The grant manager 1230 may transmit the grant to the UE.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
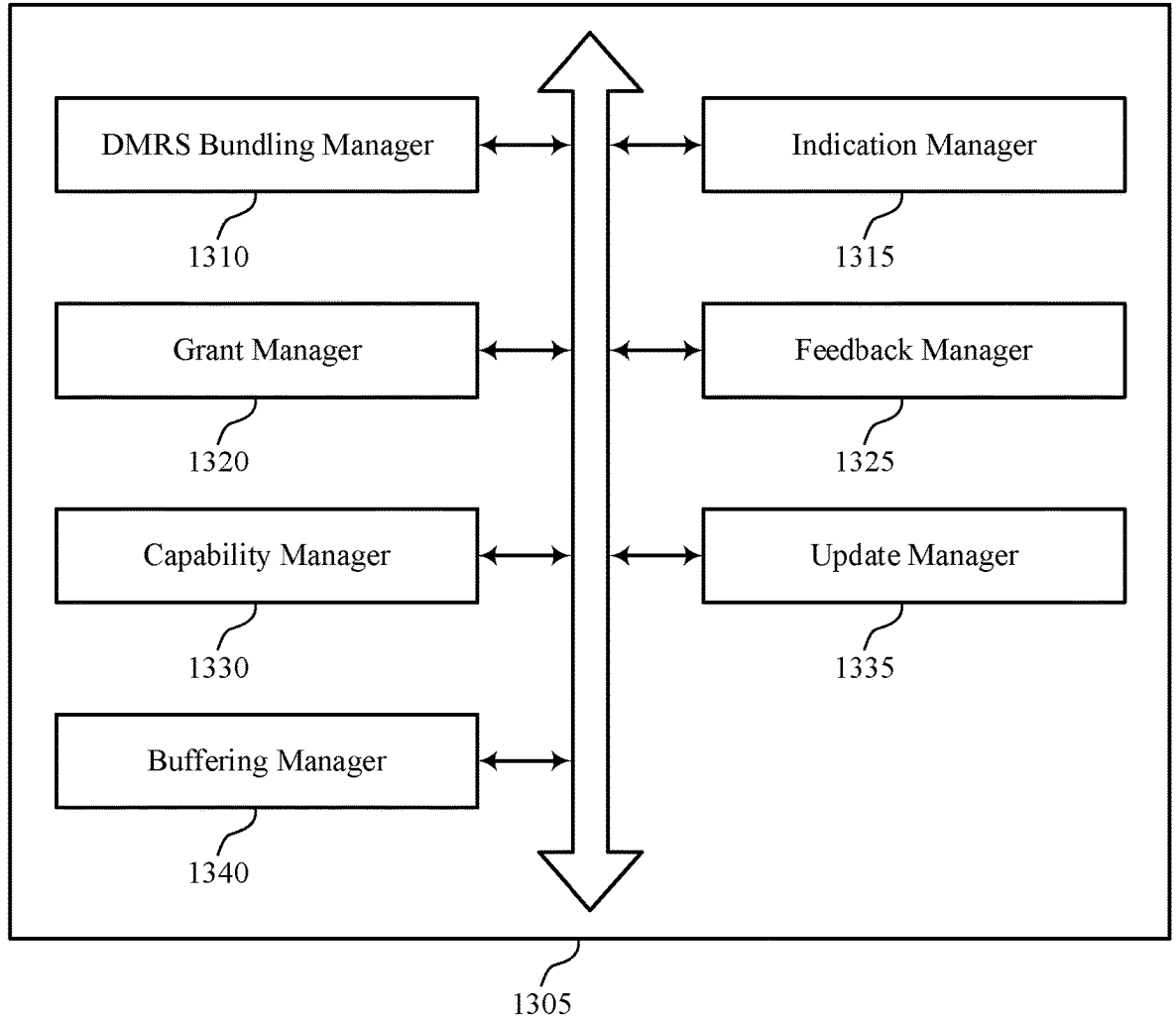
FIG. 13 shows a block diagram of a communications manager that supports DMRS multi-slot bundling indication in accordance with aspects of the present disclosure.

FIG. 13 shows a block diagram 1300 of a communications manager 1305 that supports DMRS multi-slot bundling indication in accordance with aspects of the present disclosure. The communications manager 1305 may be an example of aspects of a communications manager 1115, a communications manager 1215, or a communications manager 1410 described herein. The communications manager 1305 may include a DMRS bundling manager 1310, an indication manager 1315, a grant manager 1320, a feedback manager 1325, a capability manager 1330, an update manager 1335, and a buffering manager 1340. Each of these modules may communicate, directly or indirectly, with one another (e.g., via one or more buses).

The DMRS bundling manager 1310 may select a DMRS bundling configuration for a UE to use for demodulating a grant, the DMRS bundling configuration identifying a set of slots across which the UE is to bundle DMRSs for performing channel estimation. In some cases, the DMRS bundling configuration is based on a first subset of slots that at least partially overlap with a second subset of slots. In some cases, the DMRS bundling configuration is based on a first subset of slots that are non-overlapping with a second subset of slots.

The indication manager 1315 may transmit, to the UE, an indication of the DMRS bundling configuration. In some cases, the indication is transmitted in at least one of a DCI grant, or a RRC grant, or a combination thereof. In some cases, the indication is transmitted in at least one of a UE-specific grant, or a common grant, or a combination thereof.

The grant manager 1320 may transmit the grant to the UE.

The feedback manager 1325 may receive one or more feedback messages from the UE indicating that a channel performance for a channel between the base station and UE satisfies a threshold, where the indication of the DMRS bundling configuration is transmitted based on the one or more channel feedback messages.

The capability manager 1330 may receive a capability message indicating support for the UE to receive the indication of the DMRS bundling configuration, where the selected DMRS bundling configuration is based on the UE capability message.

The update manager 1335 may receive, from the UE, a request for an updated DMRS bundling configuration based on the UE unsuccessfully demodulating of the grant according to the DMRS bundling configuration. In some examples, the update manager 1335 may transmit an indication of an updated DMRS bundling configuration based on the request. In some cases, the capability message indicates a number of slots that the UE supports bundling.

The buffering manager 1340 may transmit an indication of a buffering reception mode for the UE to bundle the DMRSs in a RRC grant.

Figure 14:
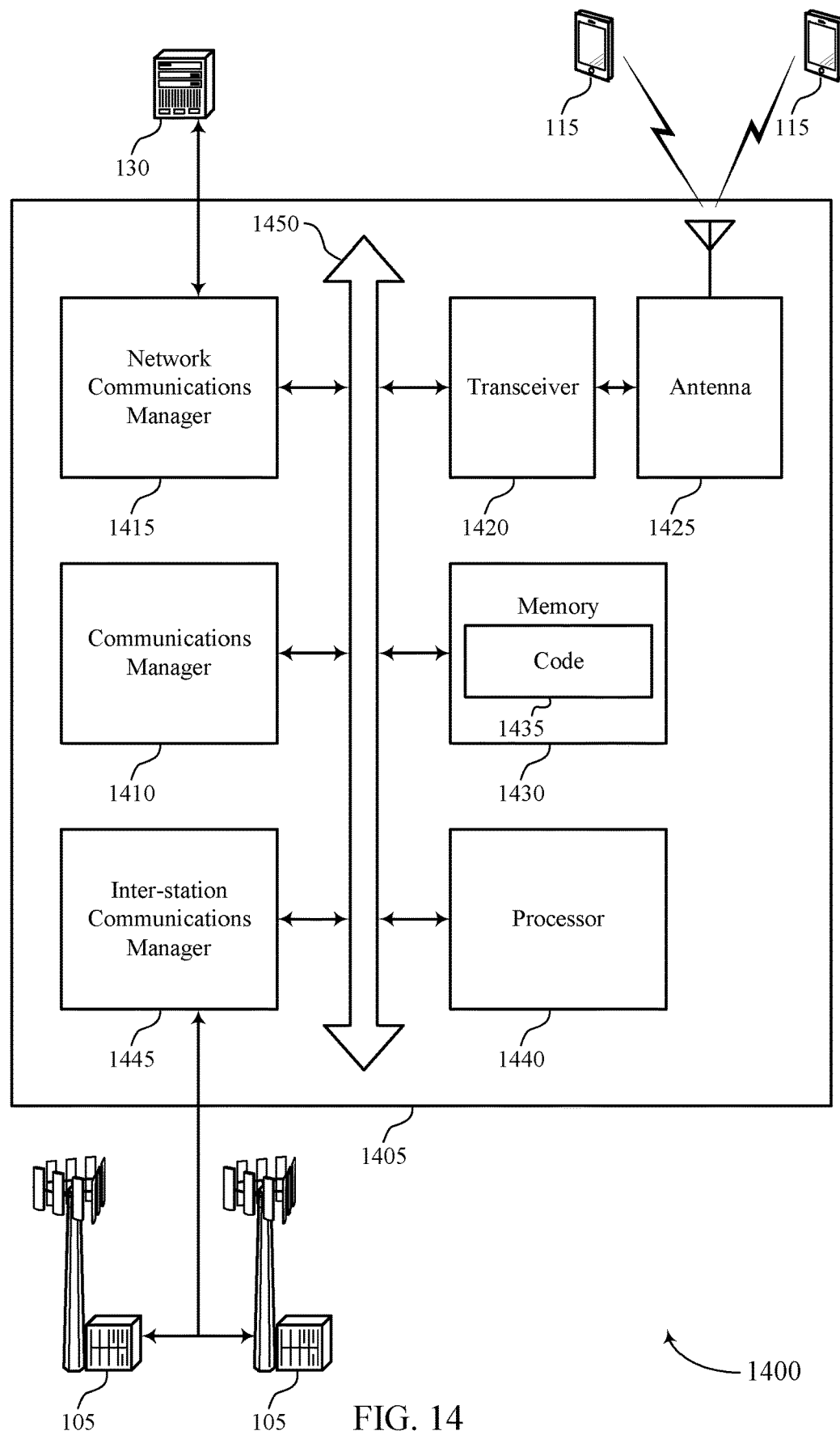
FIG. 14 shows a diagram of a system including a device that supports DMRS multi-slot bundling indication in accordance with aspects of the present disclosure.

FIG. 14 shows a diagram of a system 1400 including a device 1405 that supports DMRS multi-slot bundling indication in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may select a DMRS bundling configuration for a UE to use for demodulating a grant, the DMRS bundling configuration identifying a set of slots across which the UE is to bundle DMRSs for performing channel estimation, transmit, to the UE, an indication of the DMRS bundling configuration, and transmit the grant to the UE.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a basic input/output system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting DMRS multi-slot bundling indication).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

FIG. 15 shows a flowchart illustrating a method 1500 that supports DMRS multi-slot bundling indication in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, an indication of a DMRS bundling configuration to be used by the UE for demodulating a grant. The operations of 1505 may be performed according to the methods described herein. In some examples, aspects of the operations of 1505 may be performed by an indication manager as described with reference to FIGS. 7 through 10.

At 1510, the UE may bundle a set of DMRSs received across a set of slots according to the DMRS bundling configuration. The operations of 1510 may be performed according to the methods described herein. In some examples, aspects of the operations of 1510 may be performed by a DMRS bundling manager as described with reference to FIGS. 7 through 10.

At 1515, the UE may perform channel estimation based on the bundled DMRSs. The operations of 1515 may be performed according to the methods described herein. In some examples, aspects of the operations of 1515 may be performed by a channel estimation manager as described with reference to FIGS. 7 through 10.

At 1520, the UE may demodulate the grant based on the channel estimation. The operations of 1520 may be performed according to the methods described herein. In some examples, aspects of the operations of 1520 may be performed by a demodulation manager as described with reference to FIGS. 7 through 10.

FIG. 16 shows a flowchart illustrating a method 1600 that supports DMRS multi-slot bundling indication in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may transmit one or more feedback messages to a base station indicating that a channel performance for a channel between the base station and UE satisfies a threshold, where the indication of the DMRS bundling configuration is received based on the one or more channel feedback messages. The operations of 1605 may be performed according to the methods described herein. In some examples, aspects of the operations of 1605 may be performed by a feedback manager as described with reference to FIGS. 7 through 10.

At 1610, the UE may receive, from a base station, an indication of a DMRS bundling configuration to be used by the UE for demodulating a grant. The operations of 1610 may be performed according to the methods described herein. In some examples, aspects of the operations of 1610 may be performed by an indication manager as described with reference to FIGS. 7 through 10.

At 1615, the UE may bundle a set of DMRSs received across a set of slots according to the DMRS bundling configuration. The operations of 1615 may be performed according to the methods described herein. In some examples, aspects of the operations of 1615 may be performed by a DMRS bundling manager as described with reference to FIGS. 7 through 10.

At 1620, the UE may perform channel estimation based on the bundled DMRSs. The operations of 1620 may be performed according to the methods described herein. In some examples, aspects of the operations of 1620 may be performed by a channel estimation manager as described with reference to FIGS. 7 through 10.

At 1625, the UE may demodulate the grant based on the channel estimation. The operations of 1625 may be performed according to the methods described herein. In some examples, aspects of the operations of 1625 may be performed by a demodulation manager as described with reference to FIGS. 7 through 10.

FIG. 17 shows a flowchart illustrating a method 1700 that supports DMRS multi-slot bundling indication in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may transmit a capability message indicating support for receiving the indication of the DMRS bundling configuration. The operations of 1705 may be performed according to the methods described herein. In some examples, aspects of the operations of 1705 may be performed by a capability manager as described with reference to FIGS. 7 through 10.

At 1710, the UE may receive, from a base station, an indication of a DMRS bundling configuration to be used by the UE for demodulating a grant. The operations of 1710 may be performed according to the methods described herein. In some examples, aspects of the operations of 1710 may be performed by an indication manager as described with reference to FIGS. 7 through 10.

At 1715, the UE may bundle a set of DMRSs received across a set of slots according to the DMRS bundling configuration. The operations of 1715 may be performed according to the methods described herein. In some examples, aspects of the operations of 1715 may be performed by a DMRS bundling manager as described with reference to FIGS. 7 through 10.

At 1720, the UE may perform channel estimation based on the bundled DMRSs. The operations of 1720 may be performed according to the methods described herein. In some examples, aspects of the operations of 1720 may be performed by a channel estimation manager as described with reference to FIGS. 7 through 10.

At 1725, the UE may demodulate the grant based on the channel estimation. The operations of 1725 may be performed according to the methods described herein. In some examples, aspects of the operations of 1725 may be performed by a demodulation manager as described with reference to FIGS. 7 through 10.

FIG. 18 shows a flowchart illustrating a method 1800 that supports DMRS multi-slot bundling indication in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may select a DMRS bundling configuration for a UE to use for demodulating a grant, the DMRS bundling configuration identifying a set of slots across which the UE is to bundle DMRSs for performing channel estimation. The operations of 1805 may be performed according to the methods described herein. In some examples, aspects of the operations of 1805 may be performed by a DMRS bundling manager as described with reference to FIGS. 11 through 14.

At 1810, the base station may transmit, to the UE, an indication of the DMRS bundling configuration. The operations of 1810 may be performed according to the methods described herein. In some examples, aspects of the operations of 1810 may be performed by an indication manager as described with reference to FIGS. 11 through 14.

At 1815, the base station may transmit the grant to the UE. The operations of 1815 may be performed according to the methods described herein. In some examples, aspects of the operations of 1815 may be performed by a grant manager as described with reference to FIGS. 11 through 14.

FIG. 19 shows a flowchart illustrating a method 1900 that supports DMRS multi-slot bundling indication in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below.

Additionally or alternatively, a base station may perform aspects of the functions described below using special-purpose hardware.

At 1905, the base station may select a DMRS bundling configuration for a UE to use for demodulating a grant, the DMRS bundling configuration identifying a set of slots across which the UE is to bundle DMRSs for performing channel estimation. The operations of 1905 may be performed according to the methods described herein. In some examples, aspects of the operations of 1905 may be performed by a DMRS bundling manager as described with reference to FIGS. 11 through 14.

At 1910, the base station may transmit, to the UE, an indication of the DMRS bundling configuration. The operations of 1910 may be performed according to the methods described herein. In some examples, aspects of the operations of 1910 may be performed by an indication manager as described with reference to FIGS. 11 through 14.

At 1915, the base station may transmit the grant to the UE. The operations of 1915 may be performed according to the methods described herein. In some examples, aspects of the operations of 1915 may be performed by a grant manager as described with reference to FIGS. 11 through 14.

At 1920, the base station may receive, from the UE, a request for an updated DMRS bundling configuration based on the UE unsuccessfully demodulating of the grant according to the DMRS bundling configuration. The operations of 1920 may be performed according to the methods described herein. In some examples, aspects of the operations of 1920 may be performed by an update manager as described with reference to FIGS. 11 through 14.

At 1925, the base station may transmit an indication of an updated DMRS bundling configuration based on the request. The operations of 1925 may be performed according to the methods described herein. In some examples, aspects of the operations of 1925 may be performed by an update manager as described with reference to FIGS. 11 through 14.

Figure 20:
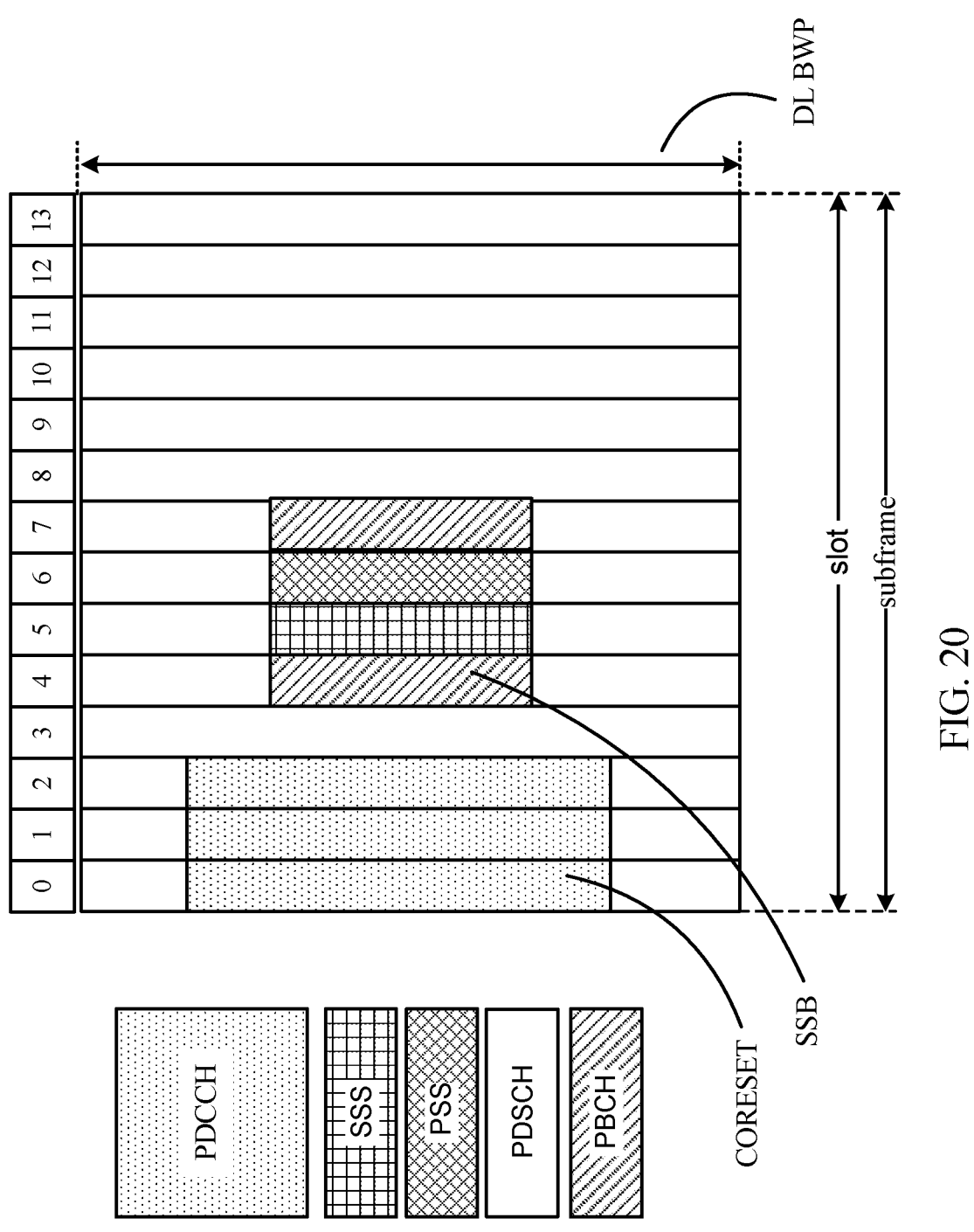
FIG. 20 is a diagram illustrating an example frame structure and channel within the frame structure, according to aspects of the present disclosure.

FIG. 20 illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 20, a PSS is used by a UE to determine subframe/symbol timing and a physical layer identity. A SSS is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The PBCH, which carries an MIB, may be logically grouped with the PSS and SSS to form an SSB (also referred to as an SS/PBCH). The MIB provides a number of RBs in the downlink system bandwidth and a SFN. The PDSCH carries user data, broadcast system information not transmitted through the PBCH, such as system information blocks (SIBs), and paging messages.

The PDCCH carries DCI within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 20, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 20 is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (e.g., up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Referring to PDCCH resource allocation in greater detail, in NR, the REGs within a CORESET are numbered in increasing order in a time-first manner, starting with '0' for the first OFDM symbol and the lowest-numbered RB in the CORESET. A REG bundle consists of L B consecutive REGs, where L B is the REG bundle size, and can, in NR, be '2,' '3,' or '6,' configured per CORESET. A REG bundle is the smallest physical resource unit that can be allocated to a PDCCH.

In NR, a CCE generally corresponds to the physical resources of six REGs. A PDCCH is assigned with a number L consecutive CCEs, where L is known as the "aggregation level." CCEs are defined in the virtual resource domain. A CCE in the virtual resource domain is mapped to one or more REG bundles in the physical resource domain by a CCE-to-REG mapping function. The function realizes distributive or sequential mapping. A CCE may be mapped to three, two, or one REG bundle(s) corresponding to a REG bundle size of '2,' '3,' or '6.'

The procedure for allocating PDCCH resources is to first assign continuously numbered CCEs in the virtual resource domain to the PDCCH. Next, the assigned CCEs are mapped to REG bundles in the physical time and frequency resource grid.

The DMRS associated with a PDCCH (referred to as a "PDCCH DMRS" or simply "DMRS") can be transmitted in narrowband (NB) or wideband (WB) mode; the configuration is per CORESET. For wideband mode, PDCCH DMRS are transmitted in the whole segment of contiguous RBs allocated to the CORESET if at least one REG bundle of the PDCCH is transmitted in the segment. The same precoder is used in the segment of contiguous RBs, and the RRC configuration parameter precoderGranularity is set to the value of allContiguousRBs. For narrowband mode, PDCCH DMRS are transmitted in one or more REG bundles constituting the PDCCH. The same precoder is used in each REG bundle of the PDCCH, and the RRC configuration parameter precoderGranularity is set to the value of sameAs-REG-bundle.

PDCCH DMRS may be bundled together in the time domain. Specifically, if a DMRS is coherently transmitted over different time instants (e.g., slots), then at the receiver (e.g., a UE), the DMRS over the different time instants can be jointly processed (e.g., coherently filtered) to enhance the accuracy of channel estimation. This allows for enhanced coverage, high mobility, and low DMRS overhead and peak throughput. Currently, the PDCCH DMRS in three consecutive slots are bundled together. Each slot may include one or more PDCCH DMRS, and there may be the same or different numbers of PDCCH DMRS in each slot of a bundle.

Figure 21:
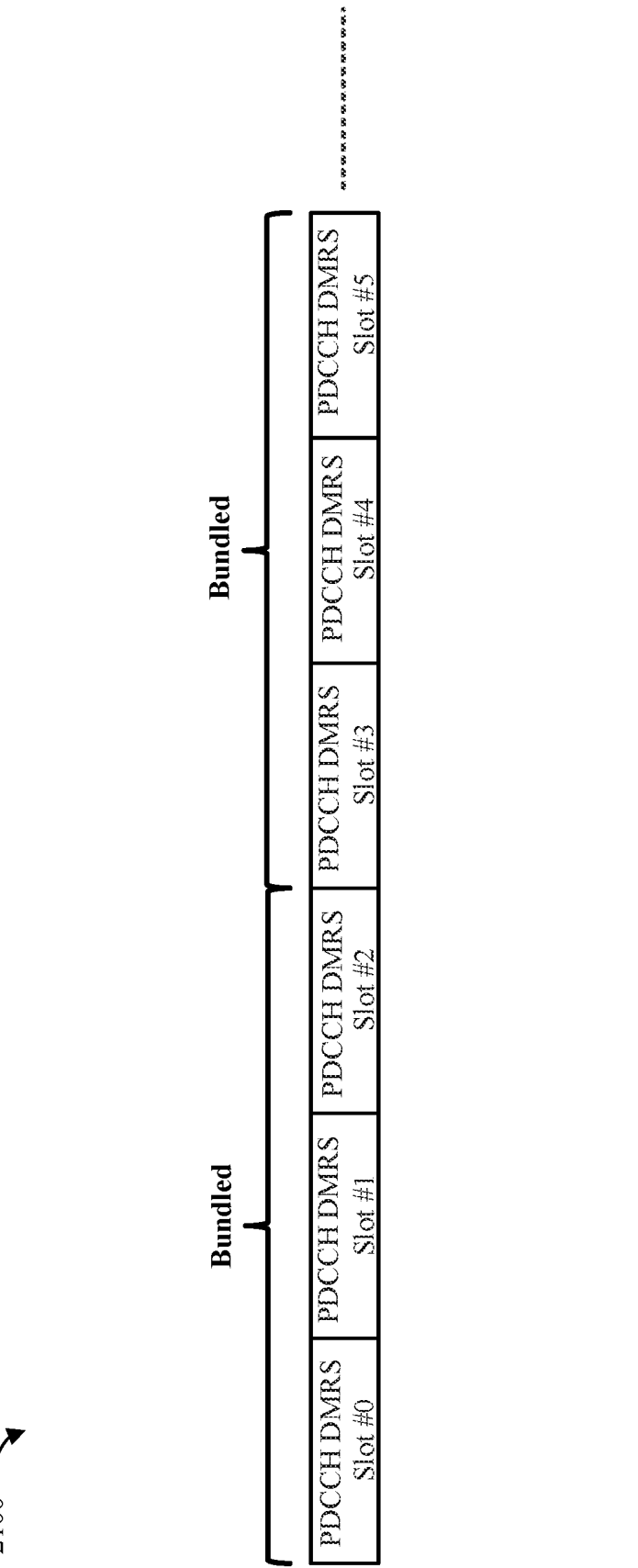
FIG. 21 is a diagram of conventional groupings of slots containing physical downlink control channel (PDCCH) DMRS, according to aspects of the present disclosure.

FIG. 21 is a diagram 2100 of conventional groupings of slots containing PDCCH DMRS. Specifically, FIG. 21 illustrates two bundles of slots, each bundle including three slots. There may be one or more PDCCH DMRS in each slot of a bundle. As will be appreciated, although FIG. 21 only illustrates two bundles, the repetition of bundles of three slots can continue indefinitely.

For channels with fast time and/or frequency variation properties, to ensure higher reliability, a UE needs to decode multiple bundling slot numbers to demodulate the PDCCH DMRS, which results in higher processing complexity and lacks flexibility. More specifically, the UE needs to process more DMRS in a single slot, which leads to greater processing complexity.

The present disclosure provides techniques for using the DCI carried on the PDCCH to explicitly trigger the PDCCH DMRS bundling boundary. In an aspect, RRC signaling can be used to enable DCI-guided (i.e., triggered) PDCCH DMRS reception bundling. Specifically, a one-bit field, referred to herein as PDCCH DMRSDCI trigger, can be added to the RRC signaling transmitted by the base station transmitting the PDCCH DMRS. When this field/bit is present, or set to, for example, '1,' it can signal the activation of the disclosed DCI-triggered PDCCH DMRS bundling mode.

For the DCI-triggered PDCCH DMRS bundling mode, a one-bit field, referred to herein as a "bundling indicator," is added to the DCI to dynamically trigger a new PDCCH DMRS bundle (or "bundling set"). That is, the bundling indicator indicates (triggers) the end of the current bundle and the start of a new bundle (the "bundling boundary").

As a first option, the bundling indicator bit is not always present. If the bit is present in the DCI, it indicates that a new PDCCH DMRS bundling set begins in the next slot. As a second option, the bundling indicator bit is always present in the DCI in a slot. If the value of the bit in the current slot is different from the value of the bit in the previous slot, it indicates that a new PDCCH DMRS bundling set begins in the next slot. If the value of the bit is the same as the value of the bit in the previous slot, then the UE continues the current bundling.

Figure 22:
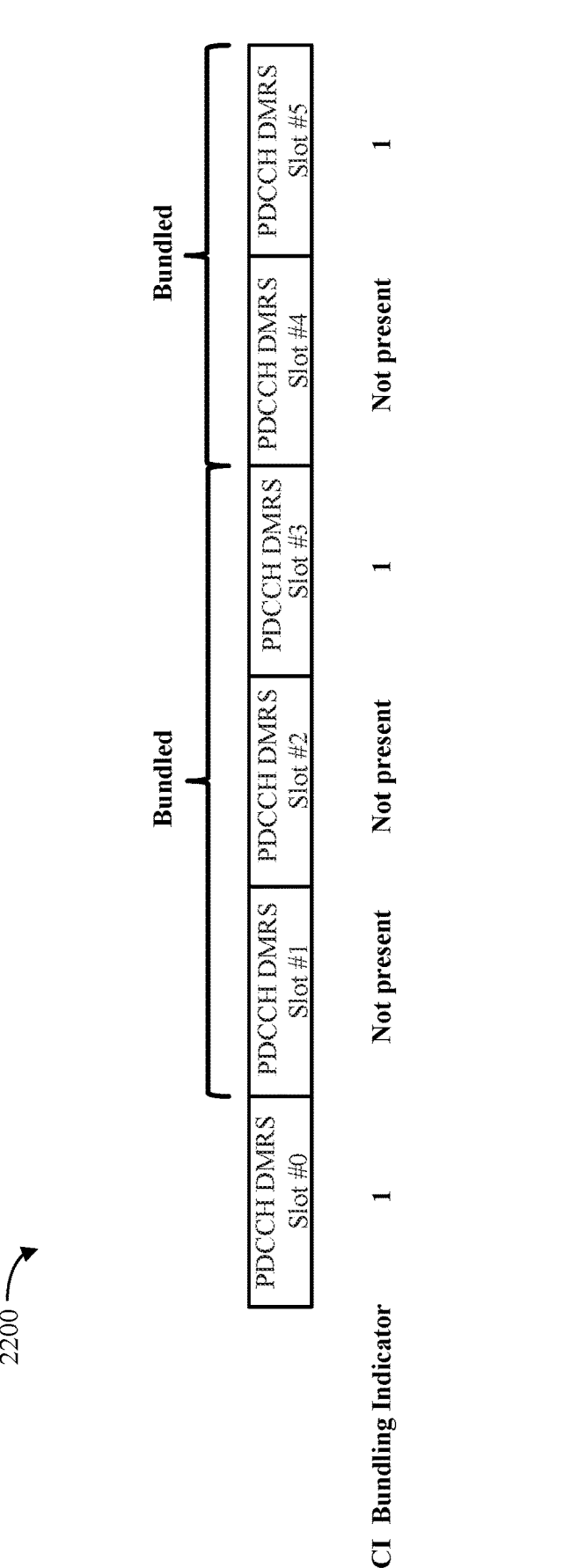
FIGS. 22 and 23 are diagrams illustrating exemplary options for triggering PDCCH DMRS bundles, according to aspects of the present disclosure.

FIG. 22 is a diagram 2200 illustrating the first option described above. In the example of FIG. 22, the DCI bundling indicator is present in the first slot illustrated ("Slot #0"), indicating that a new PDCCH DMRS bundling set (i.e., bundle) is to begin in the next slot. The DCI bundling indicator is then not present in the next two slots ("Slot #1" and "Slot #2"), but is present again in the fourth slot ("Slot #3"). As such, the first bundle in the example of FIG. 22 consists of three slots, "Slot #1," "Slot #2," and "Slot #3." The DCI bundling indicator being present in "Slot #3"

indicates that a new PDCCH DMRS bundling set is to begin in the next slot ("Slot #4"). The DCI bundling indicator is then not present in "Slot #4," but is present again in the next slot ("Slot #5"). As such, the second bundle in the example of FIG. 22 consists of two slots, "Slot #4" and "Slot #5."

Figure 23:
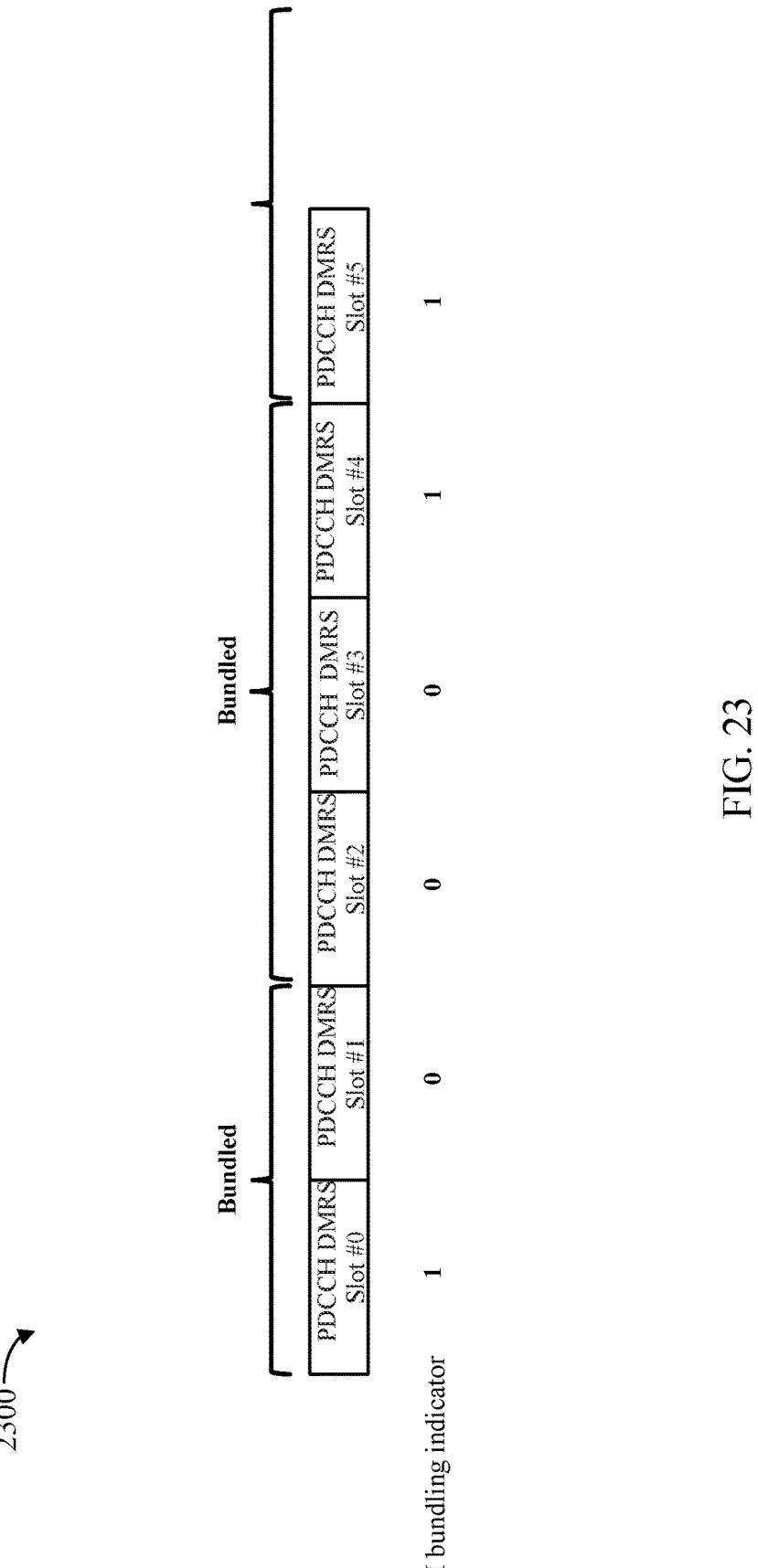

FIG. 23 is a diagram 2300 illustrating the second option described above. In the example of FIG. 23, the DCI bundling indicator is set to '1' in the first slot ("Slot #0") of a first bundle, and changes to '0' in the next slot ("Slot #1") of the first bundle, indicating that a new PDCCH DMRS bundling set (i.e., bundle) is to begin in the next slot. In the example of FIG. 23, the DCI bundling indicator remains '0' in the first two slots ("Slot #2" and "Slot #3") of the second bundle, then changes to '1' in the third slot ("Slot #4"), indicating that a new PDCCH DMRS bundling set (i.e., bundle) is to begin in the next slot. Thus, the first bundle illustrated in FIG. 23 consists of two slots, "Slot #0" and "Slot #1," and the second bundle consists of three slots, "Slot #2," "Slot #3," and "Slot #4."

As will be appreciated, the triggering of PDCCH DMRS bundling sets illustrated in FIGS. 23 and 24 can continue indefinitely, so long as a UE is receiving PDCCH DMRS from a base station (e.g., so long as the UE is connected to the base station), or until the base station signals an end to the DCI-triggered PDCCH DMRS bundling mode. In addition, while FIGS. 23 and 24 illustrate bundles of two and three slots, as will be appreciated, bundles may be any length, including only one slot and greater than three slots.

As will be appreciated, the DCI-triggered PDCCH DMRS bundling described herein can reduce the UE's processing complexity and provide flexibility. For example, for a high-end, or premium, UE with sufficient processing capability, a base station can configure a UE with a longer bundling duration (i.e., larger bundling sets) to enhance the UE's channel estimation performance. However, for low-tier UEs, the base station two short bundling durations may be sufficient for channel estimation.

FIG. 24 illustrates an exemplary method 2400 of wireless communication, according to aspects of the disclosure. In an aspect, the method 2400 may be performed by a UE (e.g., any of the UEs described herein).

At 2410, the UE receives, from a base station (e.g., any of the base stations described herein) in a first time interval (e.g., a slot or subframe), a first trigger (e.g., a one-bit DCI field) indicating that a next time interval after the first time interval is a start of a first bundle of time intervals containing PDCCH DMRS. In an aspect, operation 2410 may be performed by WWAN transceiver, processing system, memory, and/or PDCCH DMRS measurement component, any or all of which may be considered means for performing this operation.

At 2420, the UE measures PDCCH DMRS in each time interval after the first time interval until a second trigger is received from the base station in a second time interval, the second trigger indicating that a next time interval after the second time interval is a start of a second bundle of time intervals containing PDCCH DMRS. In an aspect, operation 2420 may be performed by WWAN transceiver, processing system, memory, and/or PDCCH DMRS measurement component, any or all of which may be considered means for performing this operation.

FIG. 25 illustrates an exemplary method 2500 of wireless communication, according to aspects of the disclosure. In an aspect, the method 2500 may be performed by a base station (e.g., any of the base stations described herein).

At 2510, the base station transmits, to a UE (e.g., any of the UEs described herein) in a first time interval (e.g., a slot or subframe), a first trigger (e.g., a one-bit DCI field) indicating that a next time interval after the first time interval is a start of a first bundle of time intervals containing PDCCH DMRS. In an aspect, operation 2510 may be performed by WWAN transceiver, processing system, memory, and/or PDCCH DMRS measurement component, any or all of which may be considered means for performing this operation.

At 2520, the base station transmits, to the UE in a second time interval, a second trigger indicating that a next time interval after the second time interval is a start of a second bundle of time intervals containing PDCCH DMRS. The UE is expected to measure PDCCH DMRS from the base station in each time interval after the first time interval until the second trigger. In an aspect, operation 2520 may be performed by WWAN transceiver, processing system, memory, and/or PDCCH DMRS measurement component, any or all of which may be considered means for performing this operation.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving, from a base station, an indication of a DMRS bundling configuration to be used by the UE for demodulating a grant; bundling a plurality of DMRSs received across a plurality of slots according to the DMRS bundling configuration; performing a channel estimation based at least in part on the bundled DMRSs; and demodulating the grant based at least in part on the channel estimation.

Aspect 2: The method of aspect 1, wherein the indication is received in at least one of a DCI grant, or an RRC grant, or a combination thereof.

Aspect 3: The method of any of aspects 1 through 2, further comprising: transmitting one or more feedback messages to the base station indicating that a channel performance for a channel between the base station and UE satisfies a threshold, wherein the indication of the DMRS bundling configuration is received based at least in part on the one or more channel feedback messages.

Aspect 4: The method of any of aspects 1 through 3, wherein bundling the plurality of DMRSs comprise bundling the plurality of DMRSs during a set of slots according to the DMRS bundling configuration, wherein the set of slots begin with the first slot and comprise one or more subsequent slots.

Aspect 5: The method of any of aspects 1 through 4, wherein bundling the plurality of DMRSs comprise bundling the plurality of DMRSs during a set of slots according to the DMRS bundling configuration, wherein the set of slots begin with one or more previous slots before the first slot and comprise at least the first slot.

Aspect 6: The method of aspect 5, further comprising: receiving an indication of a buffering reception mode bundling the plurality of DMRSs in an RRC grant.

Aspect 7: The method of any of aspects 1 through 6, wherein bundling the plurality of DMRSs comprises: bundling the plurality of the DMRSs during a first subset of slots according to the DMRS bundling configuration; and bundling the plurality of the DMRSs during a second subset of slots according to the DMRS bundling configuration.

Aspect 8: The method of aspect 7, wherein the first subset of slots at least partially overlaps with the second subset of slots.

Aspect 9: The method of any of aspects 7 through 8, wherein the first subset of slots are non-overlapping with the second subset of slots.

Aspect 10: The method of any of aspects 1 through 9, wherein bundling the plurality of DMRSs is based at least in part on detecting the grant.

Aspect 11: The method of any of aspects 1 through 10, further comprising: transmitting a capability message indicating support for receiving the indication of the DMRS bundling configuration.

Aspect 12: The method of aspect 11, wherein the capability message indicates a number of slots that the UE supports bundling.

Aspect 13: The method of any of aspects 1 through 12, further comprising: determining that the demodulation of the grant was unsuccessful; and transmitting a request for an updated DMRS bundling configuration based at least in part on the unsuccessful demodulation of the grant.

Aspect 14: The method of any of aspects 1 through 13, wherein the indication is received in at least one of a UE-specific grant, or a common grant, or a combination thereof.

Aspect 15: A method for wireless communications at a base station, comprising: selecting a DMRS bundling configuration for a UE to use for demodulating a grant, the DMRS bundling configuration identifying a plurality of slots across which the UE is to bundle DMRSs for performing channel estimation; transmitting, to the UE, an indication of the DMRS bundling configuration; and transmitting the grant to the UE.

Aspect 16: The method of aspect 15, wherein the indication is transmitted in at least one of a DCI grant, or an RRC grant, or a combination thereof.

Aspect 17: The method of any of aspects 15 through 16, further comprising: receiving one or more feedback messages from the UE indicating that a channel performance for a channel between the base station and UE satisfies a threshold, wherein the indication of the DMRS bundling configuration is transmitted based at least in part on the one or more channel feedback messages.

Aspect 18: The method of any of aspects 15 through 17, wherein the DMRS bundling configuration is based at least in part on a first subset of slots that at least partially overlap with a second subset of slots.

Aspect 19: The method of any of aspects 15 through 18, wherein the DMRS bundling configuration is based at least in part on a first subset of slots that are non-overlapping with a second subset of slots.

Aspect 20: The method of any of aspects 15 through 19, further comprising: receiving a UE capability message indicating support for the UE to receive the indication of the DMRS bundling configuration, wherein the selected DMRS bundling configuration is based at least in part on the UE capability message.

Aspect 21: The method of aspect 20, wherein the capability message indicates a number of slots that the UE supports bundling.

Aspect 22: The method of any of aspects 15 through 21, further comprising: receiving, from the UE, a request for an updated DMRS bundling configuration based at least in part on the UE unsuccessfully demodulating of the grant according to the DMRS bundling configuration; and transmitting an indication of the updated DMRS bundling configuration based at least in part on the request.

Aspect 23: The method of any of aspects 15 through 22, wherein the indication is transmitted in at least one of a UE-specific grant, or a common grant, or a combination thereof.

Aspect 24: The method of any of aspects 15 through 23, further comprising: transmitting an indication of a buffering reception mode for the UE to bundle the DMRSs in an RRC grant.

Aspect 25: A method of wireless communication performed by a UE, comprising: receiving, from a base station in a first time interval, a first trigger indicating that a next time interval after the first time interval is a start of a first bundle of time intervals containing PDCCH DMRSs; and measuring PDCCH DMRS in each time interval after the first time interval until a second trigger is received from the base station in a second time interval, the second trigger indicating that a next time interval after the second time interval is a start of a second bundle of time intervals containing PDCCH DMRS.

Aspect 26: The method of aspect 25, wherein the first trigger is received in first DCI of the first time interval; and the second trigger is received in second DCI of the second time interval.

Aspect 27: The method of aspect 26, wherein the first trigger is a one-bit field in the first DCI of the first time interval; and the second trigger is a one-bit field in the second DCI of the second time interval.

Aspect 28: The method of aspect 27, wherein the second trigger indicates that the next time interval after the second time interval is the start of the second bundle of time intervals containing PDCCH DMRS based on the one-bit field in the second DCI being different than the one-bit field in the first DCI.

Aspect 29: The method of any of aspects 27 through 28, wherein the first trigger indicates that the next time interval after the first time interval is the start of the first bundle of time intervals containing PDCCH DMRS based on the one-bit field in the first DCI being present in the first DCI; and the second trigger indicates that the next time interval after the second time interval is the start of the second bundle of time intervals containing PDCCH DMRS based on the one-bit field in the second DCI being present in the second DCI.

Aspect 30: The method of any of aspects 25 through 29, further comprising: receiving, from the base station, higher layer signaling indicating that DCI will be used to trigger PDCCH DMRS bundling.

Aspect 31: The method of aspect 30, wherein the higher layer signaling comprises RRC signaling.

Aspect 32: The method of aspect 31, wherein the RRC signaling comprises a one-bit field.

Aspect 33: The method of any of aspects 25 through 32, wherein a time interval is a slot or subframe of a radio frame.

Aspect 34: The method of any of aspects 25 through 33, wherein the base station is a serving base station of the UE.

Aspect 35: A method of wireless communication performed by a base station, comprising: transmitting, to a UE in a first time interval, a first trigger indicating that a next time interval after the first time interval is a start of a first bundle of time intervals containing PDCCH DMRSs; transmitting, to the UE in a second time interval, a second trigger indicating that a next time interval after the second time interval is a start of a second bundle of time intervals containing PDCCH DMRS; and wherein the UE is expected to measure PDCCH DMRS from the base station in each time interval after the first time interval until the second trigger.

Aspect 36: The method of aspect 35, wherein the first trigger is transmitted in first DCI of the first time interval; and the second trigger is transmitted in second DCI of the second time interval.

Aspect 37: The method of aspect 36, wherein the first trigger is a one-bit field in the first DCI of the first time interval; and the second trigger is a one-bit field in the second DCI of the second time interval.

Aspect 38: The method of aspect 37, wherein the second trigger indicates that the next time interval after the second time interval is the start of the second bundle of time intervals containing PDCCH DMRS based on the one-bit field in the second DCI being different than the one-bit field in the first DCI.

Aspect 39: The method of any of aspects 37 through 38, wherein the first trigger indicates that the next time interval after the first time interval is the start of the first bundle of time intervals containing PDCCH DMRS based on the one-bit field in the first DCI being present in the first DCI; and the second trigger indicates that the next time interval after the second time interval is the start of the second bundle of time intervals containing PDCCH DMRS based on the one-bit field in the second DCI being present in the second DCI.

Aspect 40: The method of any of aspects 35 through 39, further comprising: transmitting, to the UE, higher layer signaling indicating that DCI will be used to trigger PDCCH DMRS bundling.

Aspect 41: The method of aspect 40, wherein the higher layer signaling comprises RRC signaling.

Aspect 42: The method of aspect 41, wherein the RRC signaling comprises a one-bit field.

Aspect 43: The method of any of aspects 35 through 42, wherein a time interval is a slot or a subframe of a radio frame.

Aspect 44: The method of any of aspects 35 through 43, wherein the base station is a serving base station of the UE.

Aspect 45: An apparatus for wireless communications at a UE, comprising a processor; memory coupled with the processor; and instructions stored in the memory and executable by the processor to cause the apparatus to perform a method of any of aspects 1 through 14.

Aspect 46: An apparatus for wireless communications at a UE, comprising at least one means for performing a method of any of aspects 1 through 14.

Aspect 47: A non-transitory computer-readable medium storing code for wireless communications at a UE, the code comprising instructions executable by a processor to perform a method of any of aspects 1 through 14.

Aspect 48: An apparatus for wireless communications at a base station, comprising a processor; memory coupled with the processor; and instructions stored in the memory and executable by the processor to cause the apparatus to perform a method of any of aspects 15 through 24.

Aspect 49: An apparatus for wireless communications at a base station, comprising at least one means for performing a method of any of aspects 15 through 24.

Aspect 50: A non-transitory computer-readable medium storing code for wireless communications at a base station, the code comprising instructions executable by a processor to perform a method of any of aspects 15 through 24.

Aspect 51: An apparatus comprising a processor; memory coupled with the processor; and instructions stored in the memory and executable by the processor to cause the apparatus to perform a method of any of aspects 25 through 34.

Aspect 52: An apparatus comprising at least one means for performing a method of any of aspects 25 through 34.

Aspect 53: A non-transitory computer-readable medium storing code the code comprising instructions executable by a processor to perform a method of any of aspects 25 through 34.

Aspect 54: An apparatus comprising a processor; memory coupled with the processor; and instructions stored in the memory and executable by the processor to cause the apparatus to perform a method of any of aspects 35 through 44.

Aspect 55: An apparatus comprising at least one means for performing a method of any of aspects 35 through 44.

Aspect 56: A non-transitory computer-readable medium storing code the code comprising instructions executable by a processor to perform a method of any of aspects 35 through 44.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
at least one processor;
memory coupled with the at least one processor; and
instructions stored in the memory and executable by the at least one processor to cause the apparatus to:
receive, from a network entity, an indication of a demodulation reference signal bundling configuration to be used by the UE for demodulating a grant received over a physical downlink control channel (PDCCH), the demodulation reference signal bundling configuration identifying a number of slots included in a plurality of slots in which the UE is to bundle demodulation reference signals received over the PDCCH for performance of channel estimation of the PDCCH;
bundle a plurality of demodulation reference signals received over the PDCCH across the plurality of slots according to the demodulation reference signal bundling configuration;
perform the channel estimation of the PDCCH based at least in part on the bundled demodulation reference signals; and
demodulate the grant received over the PDCCH based at least in part on the channel estimation.

2. The apparatus of claim 1, wherein the indication is received in at least one of a downlink control information (DCI) grant, or a radio resource control (RRC) grant, or a combination thereof.

3. The apparatus of claim 1, wherein the instructions are further executable by the at least one processor to cause the apparatus to:
transmit one or more feedback messages to the network entity indicating that a channel performance for the PDCCH between the network entity and UE satisfies a threshold, wherein the indication of the demodulation reference signal bundling configuration is received based at least in part on the one or more feedback messages.

4. The apparatus of claim 1, wherein the plurality of slots begin with a first slot and comprise one or more subsequent slots.

5. The apparatus of claim 1, wherein the plurality of slots begin with one or more previous slots before a first slot and comprise at least the first slot.

6. The apparatus of claim 5, wherein the instructions are further executable by the at least one processor to cause the apparatus to:
receive an indication of a buffering reception mode bundling the plurality of demodulation reference signals in a radio resource control (RRC) grant.

7. The apparatus of claim 1, wherein the instructions to bundle the plurality of demodulation reference signals are executable by the at least one processor to cause the apparatus to:
bundle the plurality of demodulation reference signals received over the PDCCH during a first subset of slots of the plurality of slots according to the demodulation reference signal bundling configuration; and
bundle the plurality of demodulation reference signals received over the PDCCH during a second subset of slots of the plurality of slots according to the demodulation reference signal bundling configuration.

8. The apparatus of claim 7, wherein the first subset of slots at least partially overlaps with the second subset of slots.

9. The apparatus of claim 7, wherein the first subset of slots are non-overlapping with the second subset of slots.

10. The apparatus of claim 1, wherein bundling the plurality of demodulation reference signals received over the PDCCH is based at least in part on detecting the grant.

11. The apparatus of claim 1, wherein the instructions are further executable by the at least one processor to cause the apparatus to:
transmit a capability message indicating support for receiving the indication of the demodulation reference signal bundling configuration.

12. The apparatus of claim 11, wherein the capability message indicates the number of slots that the UE supports bundling.

13. An apparatus for wireless communications at a network entity, comprising:
at least one processor;
memory coupled with the at least one processor; and
instructions stored in the memory and executable by the at least one processor to cause the apparatus to:
select a demodulation reference signal bundling configuration for a user equipment (UE) to use for demodulating a grant received over a physical downlink control channel (PDCCH), the demodulation reference signal bundling configuration identifying a number of slots included in a plurality of slots across which the UE is to bundle demodulation reference signals received over the PDCCH for performance of channel estimation of the PDCCH;
transmit, to the UE, an indication of the demodulation reference signal bundling configuration; and
transmit the grant to the UE over the PDCCH.

14. The apparatus of claim 13, wherein the indication is transmitted in at least one of a downlink control information (DCI) grant, or a radio resource control (RRC) grant, or a combination thereof.

15. The apparatus of claim 13, wherein the instructions are further executable by the at least one processor to cause the apparatus to:
receive one or more feedback messages from the UE indicating that a channel performance for the PDCCH between the network entity and UE satisfies a threshold, wherein the indication of the demodulation reference signal bundling configuration is transmitted based at least in part on the one or more feedback messages.

16. The apparatus of claim 13, wherein the demodulation reference signal bundling configuration is based at least in part on a first subset of slots that at least partially overlap with a second subset of slots, the first subset of slots, the second subset of slots, or both, are included in the plurality of slots.

17. The apparatus of claim 13, wherein the demodulation reference signal bundling configuration is based at least in part on a first subset of slots that are non-overlapping with a second subset of slots, the first subset of slots, the second subset of slots, or both, are included in the plurality of slots.

18. The apparatus of claim 13, wherein the instructions are further executable by the at least one processor to cause the apparatus to:

receive a UE capability message indicating support for the UE to receive the indication of the demodulation reference signal bundling configuration, wherein the selected demodulation reference signal bundling configuration is based at least in part on the UE capability message.

19. The apparatus of claim 18, wherein the UE capability message indicates the number of slots that the UE supports bundling.

20. A method for wireless communications at a user equipment (UE), comprising:

receiving, from a network entity, an indication of a demodulation reference signal bundling configuration to be used by the UE for demodulating a grant received over a physical downlink control channel (PDCCH), the demodulation reference signal bundling configuration identifying a number of slots included in a plurality of slots in which the UE is to bundle demodulation reference signals received over the PDCCH for performance of channel estimation of the PDCCH;

bundling a plurality of demodulation reference signals received over the PDCCH across the plurality of slots according to the demodulation reference signal bundling configuration;

performing the channel estimation of the PDCCH based at least in part on the bundled demodulation reference signals; and demodulating the grant received over the PDCCH based at least in part on the channel estimation.

21. A method for wireless communications at a network entity, comprising:

selecting a demodulation reference signal bundling configuration for a user equipment (UE) to use for demodulating a grant received over a physical downlink control channel (PDCCH), the demodulation reference signal bundling configuration identifying a number of slots in plurality of slots across which the UE is to bundle demodulation reference signals received over the PDCCH for performance of channel estimation of the PDCCH;

transmitting, to the UE, an indication of the demodulation reference signal bundling configuration; and transmitting the grant to the UE over the PDCCH.

\* \* \* \* \*